(12) United States Patent
Ma et al.

(10) Patent No.: US 11,153,897 B2
(45) Date of Patent: Oct. 19, 2021

(54) DATA TRANSMISSION METHOD AND APPARATUS

(71) Applicant: Huawei Technologies Co., Ltd., Shenzhen (CN)

(72) Inventors: Ruixiang Ma, Beijing (CN); Yongxia Lyu, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 59 days.

(21) Appl. No.: 16/674,354

(22) Filed: Nov. 5, 2019

(65) Prior Publication Data

US 2020/0077429 A1 Mar. 5, 2020

Related U.S. Application Data

(63) Continuation of application No. PCT/CN2018/083929, filed on Apr. 20, 2018.

(30) Foreign Application Priority Data

May 5, 2017 (CN) .......................... 201710313634.6

(51) Int. Cl.
*H04W 4/00* (2018.01)
*H04W 72/12* (2009.01)
*H04W 72/04* (2009.01)

(52) U.S. Cl.
CPC ... *H04W 72/1273* (2013.01); *H04W 72/0446* (2013.01); *H04W 72/1289* (2013.01)

(58) Field of Classification Search
CPC ........... H04Q 72/1273; H04Q 72/0446; H04Q 72/1289
See application file for complete search history.

(56) References Cited

U.S. PATENT DOCUMENTS

| | | | |
|---|---|---|---|
| 2008/0225823 A1* | 9/2008 | Tenny | H04W 72/005 370/345 |
| 2012/0127938 A1 | 5/2012 | Lv et al. | |
| 2015/0009939 A1 | 1/2015 | Zhang et al. | |

(Continued)

FOREIGN PATENT DOCUMENTS

| | | |
|---|---|---|
| CN | 101287281 A | 10/2008 |
| CN | 103327615 A | 9/2013 |

(Continued)

*Primary Examiner* — Erika A Washington
(74) *Attorney, Agent, or Firm* — Leydig, Voit & Mayer, Ltd.

(57) ABSTRACT

Embodiments of the present disclosure provide a data transmission method. The method includes: sending, by a network device, first indication information, where the first indication information includes N bits, the N bits are corresponding to M time units, the M time units are corresponding to at least one time length, a value of each bit is used to indicate whether a corresponding time unit is used to transmit data of a terminal device, M is an integer greater than or equal to 1, and N is an integer greater than or equal to 1; and sending, by the network device, downlink data in a time unit that is used to transmit the data of the terminal device, where the time unit is indicated by the N bits. Therefore, a unified time domain resource indication manner can be used in different scenarios to reduce complexity of a signaling design.

12 Claims, 10 Drawing Sheets

(56) References Cited

U.S. PATENT DOCUMENTS

| | | | |
|---|---|---|---|
| 2016/0374038 A1 | 12/2016 | Wang | |
| 2017/0079085 A1* | 3/2017 | Yang | H04W 72/0446 |
| 2018/0063865 A1* | 3/2018 | Islam | H04L 5/0064 |
| 2018/0081889 A1 | 3/2018 | Chen et al. | |
| 2019/0182833 A1 | 6/2019 | Li et al. | |

FOREIGN PATENT DOCUMENTS

| | | |
|---|---|---|
| CN | 103828398 A | 5/2014 |
| CN | 104581835 A | 4/2015 |
| CN | 105451273 A | 3/2016 |
| CN | 106231677 A | 12/2016 |
| CN | 106294449 A | 1/2017 |
| CN | 106455103 A | 2/2017 |
| JP | 2015029224 A | 2/2015 |
| KR | 20120130221 A | 11/2012 |
| KR | 20190005989 A | 1/2019 |
| KR | 20190033575 A | 3/2019 |
| KR | 20190073513 A | 6/2019 |
| KR | 20190100338 A | 8/2019 |
| WO | 2010133043 A1 | 11/2010 |
| WO | 2016129274 A1 | 8/2016 |

* cited by examiner

DATA TRANSMISSION METHOD AND APPARATUS

CROSS-REFERENCE TO RELATED APPLICATIONS

This application is a continuation of International Application No. PCT/CN2018/083929, filed on Apr. 20, 2018, which claims priority to claims priority to Chinese Patent Application No. 201710313634.6, filed on May 5, 2017. The disclosures of the aforementioned applications are hereby incorporated by reference in their entireties.

TECHNICAL FIELD

Embodiments of the present disclosure relate to the communications field, and more specifically, to a data transmission method and apparatus.

BACKGROUND

In an existing communications system, in a time domain, a time unit (or a time granularity) used for communication may be at least one frame, at least one subframe, at least one slot, at least one mini-slot, or at least one symbol. A time length corresponding to one frame is 10 ms, a time length corresponding to one subframe is 1 ms, a time length corresponding to one slot is 0.5 ms or 1 ms, and a time length corresponding to one symbol may be determined based on a quantity of symbols included in one subframe.

With development of technologies, the existing communications system can be used in many application scenarios. In different application scenarios, a time domain resource used for data transmission may include time units of different time lengths, and symbols used for data transmission in one time unit may be consecutive or inconsecutive. For example, in a slot-based scheduling scenario, a time domain resource used for data transmission may be one slot or aggregation of multiple slots, time units that form the time domain resource are one or more slots, and when the time units of the time domain resource are a plurality of slots, the plurality of slots may be consecutive or inconsecutive. For another example, in an ultra-reliable and low latency communications (URLLC) scenario, a time domain resource used for data transmission may be one or more mini-slots, and each mini-slot may be corresponding to a different time length. For still another example, in a scenario of a high frequency higher than or equal to 6 GHz or in a scenario in which long term evolution (LTE) and 5G new radio (5G NR) coexist, a time domain resource used for data transmission may be one or more mini-slots, a plurality of mini-slots may be corresponding to different time lengths, and symbols included in each mini-slot may be consecutive or inconsecutive. For yet another example, in a scenario of an unlicensed frequency band, a time domain resource used for data transmission may be an aggregation of a plurality of mini-slots and a plurality of slots, and time units that form the time domain resource are a plurality of mini-slots and a plurality of slots.

In different scenarios, because a time domain resource used for data transmission includes time units of different time lengths, and the time units may be consecutive or inconsecutive, time domain resource indication manners in different scenarios may be different. This requires a system to provide, for each scenario, a signaling indication manner that is used to indicate a time unit for data transmission, and consequently, complexity of a signaling design is increased.

Therefore, a technology is urgently needed to enable use of a unified time domain resource indication manner during data transmission in different scenarios.

SUMMARY

Embodiments of the present disclosure provide a data transmission method, so that a unified time domain resource indication manner can be used in different scenarios to reduce complexity of a signaling design.

According to a first aspect, a data transmission method is provided, where the method includes:

sending, by a network device, first indication information, where the first indication information includes N bits, the N bits are corresponding to M time units, the M time units are corresponding to at least one time length, a value of each bit is used to indicate whether a corresponding time unit is used to transmit data of a terminal device, M is an integer greater than or equal to 1, and N is an integer greater than or equal to 1; and sending, by the network device, downlink data in a time unit that is used to transmit the data of the terminal device, where the time unit is indicated by the N bits.

Therefore, according to the data transmission method in this embodiment of the present disclosure, the network device sends the first indication information to the terminal device, where the N bits included in the first indication information are corresponding to the M time units, the M time units are corresponding to at least one time length, and a value of each bit is used to indicate whether a corresponding time unit is used to transmit the data for the terminal device, that is, a bitmap manner is used to indicate a time unit for transmitting the data of the terminal device. This allows the network device to use a unified time domain resource indication manner in application scenarios that support time units of different time lengths, thereby improving system flexibility, and reducing complexity of a signaling design.

With reference to the first aspect, in a first implementation of the first aspect, the N bits include P1 consecutive bits and Q1 consecutive bits, N=P1+Q1, and M is greater than or equal to N;

where, M=M1+M2, the P1 consecutive bits are corresponding to M1 time units, the Q1 consecutive bits are corresponding to M2 time units, each of the M1 time units is corresponding to a first time length, each of the M2 time units is corresponding to a second time length, and the first time length is different from the second time length.

Therefore, according to the data transmission method in this embodiment of the present disclosure, the N bits included in the first indication information are divided into the P1 consecutive bits and the Q1 consecutive bits, and the M time units are divided into the M1 time units and the M2 time units, so that the P1 bits are corresponding to the M1 time units, and the Q1 bits are corresponding to the M2 time units. The first time length corresponding to the M1 time units is different from the second time length corresponding to the M2 time units. In this way, a relatively small quantity of bits can be used to indicate a relatively long time length, thereby effectively reducing bits (or a quantity of bits) in the first indication information, or in other words, reducing signaling overheads.

With reference to the first aspect, in a second implementation of the first aspect, a last time unit in the M1 time units is located before a first time unit in the M2 time units in time domain, and the first time length is shorter than the second time length.

With reference to the first aspect, in a third implementation of the first aspect, the M1 time units belong to one slot.

With reference to the first aspect, in a fourth implementation of the first aspect, the first time length is a time length corresponding to one symbol, and the second time length is a time length corresponding to one slot.

With reference to the first aspect, in a fifth implementation of the first aspect, the N bits are divided into L groups, each of the L groups includes M consecutive bits, L is a quantity of frequency domain units, the $j^{th}$ bit in an $i^{th}$ group is corresponding to a $j^{th}$ time unit in an $i^{th}$ frequency domain unit, the $i^{th}$ group belongs to the L groups, the $i^{th}$ frequency domain unit belongs to L frequency domain units, i∈[1, L], j∈ [1, M], each of the M time units is corresponding to a third time length, M is less than or equal to N, and L is an integer greater than or equal to 1; or the N bits are divided into M groups, each of the M groups includes L consecutive bits, L is a quantity of frequency domain units, the $j^{th}$ bit in an $i^{th}$ group is corresponding to a $j^{th}$ frequency domain unit in an $i^{th}$ time unit, the $i^{th}$ group belongs to the M groups, the $i^{th}$ time unit belongs to the M time units, i∈[1, M], j∈[1, L], each of the M time units is corresponding to a fourth time length, M is less than or equal to N, and L is an integer greater than or equal to 1.

With reference to the first aspect, in a sixth implementation of the first aspect, the method further includes:

sending, by the network device, second indication information, where the second indication information is used to indicate at least one of the following values: N, P1, or Q1.

According to a second aspect, a data transmission method is provided, where the method includes:

sending, by a network device, first indication information, where the first indication information includes N bits, the N bits include P2 consecutive bits and Q2 consecutive bits, N=P2+Q2, and N is an integer greater than or equal to 1, where the P2 bits are corresponding to M3 time units, each of the M3 time units is corresponding to a fifth time length, a value of each of the P2 bits is used to indicate whether a corresponding time unit is used to transmit data of a terminal device, a first bit sequence including the Q2 bits is used to indicate a first value S1, the first value is a quantity of time units used for transmitting the data of the terminal device, each of S1 time units is corresponding to a sixth time length, M3 is greater than or equal to P2, and S1 is an integer greater than or equal to 1; or a second bit sequence including the P2 bits is used to indicate a second value S2, the second value is a quantity of time units used for transmitting data of a terminal device, a third bit sequence including the Q2 bits is used to indicate a third value S3, the third value is a quantity of time units used for transmitting the data of the terminal device, each of S2 time units is corresponding to a seventh time length, each of S3 time units is corresponding to an eighth time length, the seventh time length is different from the eighth time length, S2 is an integer greater than or equal to 1, and S3 is an integer greater than or equal to 1; and sending, by the network device, downlink data in a time unit that is used to transmit the data of the terminal device, where the time unit is indicated by the N bits.

Therefore, according to the data transmission method in this embodiment of the present disclosure, in one aspect, the N bits are divided into the P2 consecutive bits and the Q2 consecutive bits, so that the P2 bits are corresponding to the M3 time units, and the first bit sequence including the Q2 bits is used to indicate the quantity of time units for transmitting the data of the terminal device. Alternatively, the N bits are divided into the P2 consecutive bits and the Q2 consecutive bits, so that the second bit sequence including the P2 bits is used to indicate the quantity S2 of time units for transmitting the data of the terminal device, the third bit sequence including the Q2 bits is used to indicate the quantity S3 of time units for transmitting the data of the terminal device, and the seventh time length is different from the eighth time length. This allows the network device to use a unified time domain resource indication manner in application scenarios that support time units of different time lengths, thereby improving system flexibility, and reducing complexity of a signaling design.

In another aspect, a relatively small quantity of bits can be used to indicate a relatively long time length, thereby effectively reducing bits (or a quantity of bits) in the indication information, or in other words, reducing signaling overheads.

With reference to the second aspect, in a first implementation of the second aspect, the fifth time length is shorter than the sixth time length.

In this way, the fifth time length is shorter than the sixth time length, so that a relatively small quantity of bits can be used to indicate a relatively long time length, thereby effectively reducing signaling overheads.

With reference to the second aspect, in a second implementation of the second aspect, the method further includes:

sending, by the network device, third indication information, where the third indication information is used to indicate at least one of the following values: N, P2, or Q2.

According to a third aspect, a data transmission method is provided, where the method includes:

receiving, by a terminal device, first indication information sent by a network device, where the first indication information includes N bits, N is an integer greater than or equal to 1, the N bits are corresponding to M time units, the M time units are corresponding to at least one time length, a value of each bit is used to indicate whether a corresponding time unit is used to transmit data of the terminal device, and M is an integer greater than or equal to 1; and receiving, by the terminal device, downlink data in a time unit that is used to transmit the data of the terminal device, where the time unit is indicated by the N bits.

With reference to the third aspect, in a first implementation of the third aspect, the N bits include P1 consecutive bits and Q1 consecutive bits, N=P1+Q1, and M is greater than or equal to N;

where, M=M1+M2, the P1 consecutive bits are corresponding to M1 time units, the Q1 consecutive bits are corresponding to M2 time units, each of the M1 time units is corresponding to a first time length, each of the M2 time units is corresponding to a second time length, and the first time length is different from the second time length.

With reference to the third aspect, in a second implementation of the third aspect, a last time unit in the M1 time units is located before a first time unit in the M2 time units in time domain, and the first time length is shorter than the second time length.

With reference to the third aspect, in a third implementation of the third aspect, the M1 time units belong to one slot.

With reference to the third aspect, in a fourth implementation of the third aspect, the first time length is a time length corresponding to one symbol, and the second time length is a time length corresponding to one slot.

With reference to the third aspect, in a fifth implementation of the third aspect, the N bits are divided into L groups, each of the L groups includes M consecutive bits, L is a quantity of frequency domain units, the $j^{th}$ bit in an $i^{th}$ group is corresponding to a $j^{th}$ time unit in an $i^{th}$ frequency domain unit, the $i^{th}$ group belongs to the L groups, the $i^{th}$ frequency domain unit belongs to L frequency domain units, $i \in [1, L]$, $j \in [1, M]$, each of the M time units is corresponding to a third time length, M is less than or equal to N, and L is an integer greater than or equal to 1; or the N bits are divided into M groups, each of the M groups includes L consecutive bits, L is a quantity of frequency domain units, the $j^{th}$ bit in an $i^{th}$ group is corresponding to a $j^{th}$ frequency domain unit in an $i^{th}$ time unit, the $i^{th}$ group belongs to the M groups, the $i^{th}$ time unit belongs to the M time units, $i \in [1, M]$, $j \in [1, L]$, each of the M time units is corresponding to a fourth time length, M is less than or equal to N, and L is an integer greater than or equal to 1.

With reference to the third aspect, in a sixth implementation of the third aspect, the method further includes:

receiving, by the terminal device, second indication information sent by the network device, where the second indication information is used to indicate at least one of the following values: N, P1, or Q1.

According to a fourth aspect, a data transmission method is provided, where the method includes:

receiving, by a terminal device, first indication information sent by a network device, where the first indication information includes N bits, N≥1, the N bits include P2 consecutive bits and Q2 consecutive bits, and N=P2+Q2, where the P2 bits are corresponding to M3 time units, each of the M3 time units is corresponding to a fifth time length, a value of each of the P2 bits is used to indicate whether a corresponding time unit is used to transmit data of the terminal device, a first bit sequence including the Q2 bits is used to indicate a first value S1, the first value is a quantity of time units used for transmitting the data of the terminal device, each of S1 time units is corresponding to a sixth time length, M3 is greater than or equal to P2, and S1 is an integer greater than or equal to 1; or a second bit sequence including the P2 bits is used to indicate a second value S2, the second value is a quantity of time units used for transmitting data of the terminal device, a third bit sequence including the Q2 bits is used to indicate a third value S3, the third value is a quantity of time units used for transmitting the data of the terminal device, each of S2 time units is corresponding to a seventh time length, each of S3 time units is corresponding to an eighth time length, the seventh time length is different from the eighth time length, S2 is an integer greater than or equal to 1, and S3 is an integer greater than or equal to 1; and receiving, by the terminal device, downlink data in a time unit that is used to transmit the data of the terminal device, where the time unit is indicated by the N bits.

With reference to the fourth aspect, in a first implementation of the fourth aspect, the fifth time length is shorter than the sixth time length.

With reference to the fourth aspect, in a second implementation of the fourth aspect, the method further includes:

receiving, by the terminal device, third indication information sent by the network device, where the third indication information is used to indicate at least one of the following values: N, P2, or Q2.

According to a fifth aspect, a data transmission apparatus is provided, where the apparatus may be configured to perform an operation of the network device in the first aspect or any possible implementation of the first aspect. Specifically, the apparatus may include a module or unit configured to perform the operation of the network device in the first aspect or any possible implementation of the first aspect.

According to a sixth aspect, a data transmission apparatus is provided, where the apparatus may be configured to perform an operation of the network device in the second aspect or any possible implementation of the second aspect. Specifically, the apparatus may include a module or unit configured to perform the operation of the network device in the second aspect or any possible implementation of the second aspect.

According to a seventh aspect, a data transmission apparatus is provided, where the apparatus may be configured to perform an operation of the terminal device in the third aspect or any possible implementation of the third aspect. Specifically, the apparatus may include a module or unit configured to perform the operation of the terminal device in the third aspect or any possible implementation of the third aspect.

According to an eighth aspect, a data transmission apparatus is provided, where the apparatus may be configured to perform an operation of the terminal device in the fourth aspect or any possible implementation of the fourth aspect. Specifically, the apparatus may include a module or unit configured to perform the operation of the terminal device in the fourth aspect or any possible implementation of the fourth aspect.

According to a ninth aspect, a network device is provided. The network device includes a processor, a transceiver, and a memory. The processor, the transceiver, and the memory communicate with each other by using an internal connection path. The memory is configured to store an instruction. The processor is configured to execute the instruction stored in the memory. When the processor executes the instruction stored in the memory, the terminal device is enabled to perform the method in the first aspect or any possible implementation of the first aspect, or the network device implements the apparatus provided in the fifth aspect.

According to a tenth aspect, a network device is provided. The network device includes a processor, a transceiver, and a memory. The processor, the transceiver, and the memory communicate with each other by using an internal connection path. The memory is configured to store an instruction. The processor is configured to execute the instruction stored in the memory. When the processor executes the instruction stored in the memory, the network device performs the method in the second aspect or any possible implementation of the second aspect, or the network device implements the apparatus provided in the sixth aspect.

According to an eleventh aspect, a terminal device is provided. The terminal device includes a processor, a transceiver, and a memory. The processor, the transceiver, and the memory communicate with each other by using an internal connection path. The memory is configured to store an instruction. The processor is configured to execute the instruction stored in the memory. When the processor executes the instruction stored in the memory, the terminal device is enabled to perform the method in the third aspect or any possible implementation of the third aspect, or the terminal device is enabled to implement the apparatus provided in the seventh aspect.

According to a twelfth aspect, a terminal device is provided. The terminal device includes a processor, a transceiver, and a memory. The processor, the transceiver, and the memory communicate with each other by using an internal connection path. The memory is configured to store an instruction. The processor is configured to execute the instruction stored in the memory. When the processor executes the instruction stored in the memory, the terminal device performs the method in the fourth aspect or any possible implementation of the fourth aspect, or the network device implements the apparatus provided in the eighth aspect.

According to a thirteenth aspect, a computer-readable storage medium is provided, configured to store a computer program. The computer program includes an instruction used to perform the method in the first aspect or any possible implementation of the first aspect.

According to a fourteenth aspect, a computer-readable storage medium is provided, configured to store a computer program. The computer program includes an instruction used to perform the method in the second aspect or any possible implementation of the second aspect.

According to a fifteenth aspect, a computer-readable storage medium is provided, configured to store a computer program. The computer program includes an instruction used to perform the method in the third aspect or any possible implementation of the third aspect.

According to a sixteenth aspect, a computer-readable storage medium is provided, configured to store a computer program. The computer program includes an instruction used to perform the method in the fourth aspect or any possible implementation of the fourth aspect.

In some of the foregoing implementations, the method further includes:

sending, by the network device, fourth indication information, where the fourth indication information is used to determine a symbol that is in each of the M2 time units and that is used to transmit the data for the terminal device.

In some of the foregoing implementations, the method further includes:

sending, by the network device, downlink control information DCI, where the DCI includes the first indication information.

In some of the foregoing implementations, the first indication information is carried in a first time unit in the M1 time units.

In some of the foregoing implementations, the M time units are consecutive in time domain.

In some of the foregoing implementations, the method further includes:

sending, by the network device, fifth indication information to the terminal device, where the fifth indication information is used to indicate at least one of the following values: M, M1, or M2.

In some of the foregoing implementations, the method further includes:

sending, by the network device, sixth indication information to the terminal device, where the sixth indication information is used to indicate at least one of the following values: N, M, or L.

In some of the foregoing implementations, the method further includes:

sending, by the network device, seventh indication information to the terminal device, where the seventh indication information is used to indicate at least one of the following values: M or M3.

In some of the foregoing implementations, P1 or Q1 may be 0; when P1=0, N=Q1 and M=M2, that is, all the N bits are corresponding to the M time units whose time lengths are the second time length; and when Q1=0, N=P1 and M=M1, that is, all the N bits are corresponding to the M time units whose time lengths are the first time length.

DESCRIPTION OF EMBODIMENTS

Figure 1:
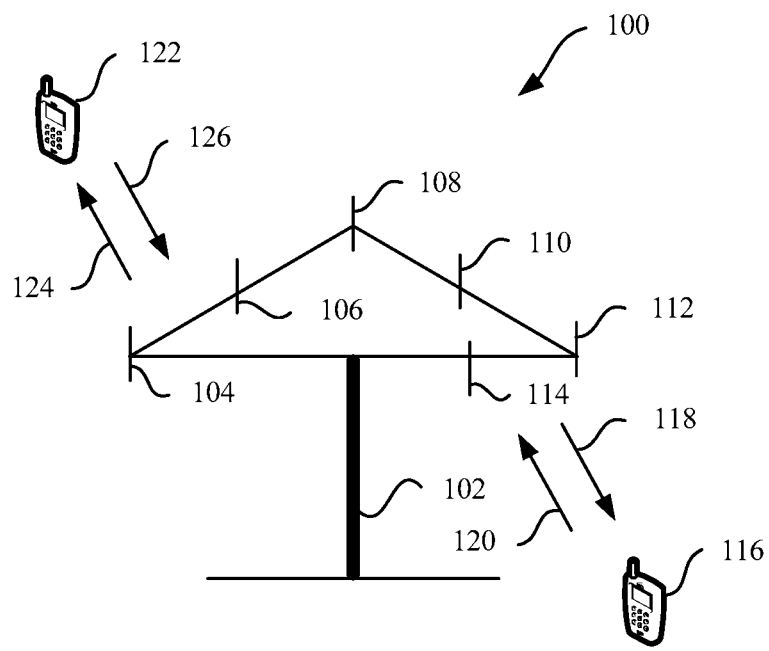
FIG. 1 is a schematic diagram of a communications system for data transmission to which an embodiment of the present disclosure is applied.

The following clearly describes the technical solutions in the embodiments of the present disclosure with reference to the accompanying drawings in the embodiments of the present disclosure.

Terminologies such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and the application that runs on a computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and based on, for example, a signal having one or more data packets (for example, data from two components interacting with another component in a local system, a distributed system, and/or across a network such as the Internet interacting with other systems by using the signal).

It should be understood that, the embodiments of the present disclosure may be applied to various communications systems, for example, systems such as a global system for mobile communications (GSM), a wideband code division multiple access (WCDMA) system, and an LTE system, and supported communication is mainly voice and data communication. Usually, a conventional base station supports a limited quantity of connections, and is easy to implement.

A next-generation mobile communications system makes future mobile data traffic growth, a massive internet of things, and diversified new services and application scenarios possible. In addition to acting as a unified connection framework, basic 5G new radio (5G NR) of a new generation cellular network is expected to increase a data speed, a capacity, a latency, reliability, efficiency, and a coverage capability of a network to a new level, and fully use available spectrum resources. Moreover, 5G based on an orthogonal frequency division multiplexing (OFDM) new radio design will become a global standard, to support 5G devices and diversified deployment, cover diversified spectrums (including low and high band coverage), and support diversified services and terminals.

The embodiments are described with respect to a terminal device in the embodiments of the present disclosure. The terminal device may also be referred to as user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The terminal device may be a station (STA) in a wireless local area network (WLAN), a cellular phone, a cordless telephone set, a session initiation protocol (SIP) phone, a wireless local loop (WLL) station, a personal digital assistant (PDA) device, a handheld device having a wireless communication function, a computing device, another processing device connected to a wireless modem, an in-vehicle device, a wearable device, a terminal device in a future 5G network, a terminal device in a future evolved PLMN network, or the like.

In addition, the embodiments are described with respect to a network device in the embodiments of the present disclosure. The network device may be a device configured to communicate with a mobile device. The network device may be an access point (AP) in a WLAN or a base transceiver station (BTS) in GSM or code division multiple access (CDMA), or may be a NodeB (NB) in WCDMA, or may be an evolved NodeB (eNB or eNodeB) in LTE, or a relay node or an access point, or an in-vehicle device, a wearable device, a network device in a future 5G network, a network device in a future evolved PLMN network, or the like.

A method and an apparatus that are provided in the embodiments of the present disclosure may be applied to the terminal device or the network device. The terminal device or the network device includes a hardware layer, an operating system layer running above the hardware layer, and an application layer running above the operating system layer. The hardware layer includes hardware such as a central processing unit (CPU), a memory management unit (MMU), and a memory (also referred to as a main memory). An operating system may be any one or more types of computer operating systems that implement service processing by using a process, for example, a Linux operating system, a Unix operating system, an Android operating system, an iOS operating system, or a Windows operating system. The application layer includes applications such as a browser, an address book, word processing software, and instant messaging software. Moreover, in the embodiments of the present disclosure, a specific structure of an entity for performing a control information transmission method is not specially limited in the embodiments of the present disclosure, provided that the entity can run a program including code of the control information transmission method in the embodiments of the present disclosure, to perform communication according to the control information transmission method in the embodiments of the present disclosure. For example, an entity for performing a wireless communication method in the embodiments of the present disclosure may be a terminal device or a network device, or a function module that is in a terminal device or a network device and that can invoke a program and execute the program.

In addition, aspects or features of the embodiments of the present disclosure may be implemented as a method, an apparatus, or a product that uses standard programming and/or engineering technologies. The term "product" used in the embodiments of the present disclosure covers a computer program that can be accessed from any computer-readable component, carrier, or medium. For example, the computer-readable medium may include but is not limited to: a magnetic storage component (for example, a hard disk, a floppy disk, or a magnetic tape), an optical disc (for example, a compact disc (CD) and a digital versatile disc (DVD)), a smart card, and a flash memory component (for example, an erasable programmable read-only memory (EPROM), a card, a stick, or a key drive). In addition, various storage media described in this specification may indicate one or more devices and/or other machine-readable media used to store information. The term "machine-readable media" may include but are not limited to a radio channel, and various other media that can store, contain, and/or carry an instruction and/or data.

FIG. 1 is a schematic diagram of a communications system for data transmission to which an embodiment of the present disclosure is applied. As shown in FIG. 1, the communications system 100 includes a network device 102. The network device 102 may include a plurality of antennas, for example, antennas 104, 106, 108, 110, 112, and 114. In addition, the network device 102 may additionally include a transmitter chain and a receiver chain. A person of ordinary skill in the art may understand that, the transmitter chain and the receiver chain each may include a plurality of components (for example, a processor, a modulator, a multiplexer, a demodulator, a demultiplexer, or an antenna) related to signal sending and receiving.

The network device 102 may communicate with a plurality of terminal devices (for example, a terminal device 116 and a terminal device 122). However, it may be understood that, the network device 102 may communicate with any quantity of terminal devices similar to the terminal device 116 or 122. The terminal devices 116 and 122 each may be, for example, a cellular phone, a smartphone, a portable computer, a handheld communications device, a handheld computing device, a satellite radio apparatus, a global positioning system, a PDA, and/or any other suitable device used for communication in the wireless communications system 100.

As shown in FIG. 1, the terminal device 116 communicates with the antennas 112 and 114. The antennas 112 and 114 send information to the terminal device 116 by using a forward link 118, and receive information from the terminal device 116 by using a reverse link 120. In addition, the terminal device 122 communicates with the antennas 104 and 106. The antennas 104 and 106 send information to the terminal device 122 by using a forward link 124, and receive information from the terminal device 122 by using a reverse link 126.

For example, in a frequency division duplex (FDD) system, the forward link 118 may use a band different from that used by the reverse link 120, and the forward link 124 may use a band different from that used by the reverse link 126.

For another example, in a time division duplex (TDD) system and a full duplex system, the forward link 118 and the reverse link 120 may use a same band, and the forward link 124 and the reverse link 126 may use a same band.

Each antenna (or antenna group including a plurality of antennas) and/or area designed for communication is referred to as a sector of the network device 102. For example, an antenna group may be designed to communicate with a terminal device in a sector of a coverage area of the network device 102. When the network device 102 communicates with the terminal devices 116 and 122 by using the forward links 118 and 124, respectively, transmit antennas of the network device 102 may improve signal-to-noise ratios of the forward links 118 and 124 through beamforming. In addition, compared with a manner in which a network device uses a single antenna to send signals to all terminal devices served by the network device, a manner in which the network device 102 sends, through beamforming, signals to the terminal devices 116 and 122 that are randomly scattered in a related coverage area causes less interference to a mobile device in a neighboring cell.

Within a given time, the network device 102, the terminal device 116, or the terminal device 122 may be a wireless communications sending apparatus and/or a wireless communications receiving apparatus. When sending data, the wireless communications sending apparatus may encode the data for transmission.

Specifically, the wireless communications sending apparatus may obtain (for example, generate, receive from another communications apparatus, or store in a memory) a specific quantity of data bits that need to be sent to the wireless communications receiving apparatus over a channel. The data bits may be included in a transport block (or a plurality of transport blocks) of data, and the transport block may be segmented to generate a plurality of code blocks.

In addition, the communications system 100 may be a public land mobile network (PLMN), a D2D network, an M2M network, or another network. FIG. 1 is only an example of a simplified schematic diagram. The network may further include another network device not shown in FIG. 1.

A time domain resource used in the communications system 100 for wireless communication is described in detail below.

In this embodiment of the present disclosure, a time domain resource used by a network device and a terminal device to transmit data may be divided into a plurality of time units in time domain.

In addition, in this embodiment of the present disclosure, the plurality of time units may be consecutive, or a preset interval is set between some adjacent time units. This is not specially limited in this embodiment of the present disclosure.

In this embodiment of the present disclosure, time units may include a time unit used for uplink data transmission and/or a time unit used for downlink data transmission.

In this embodiment of the present disclosure, a length of one time unit may be randomly set. This is not specially limited in this embodiment of the present disclosure.

For example, one time unit may include one or more subframes.

Alternatively, one time unit may include one or more slots.

Alternatively, one time unit may include one or more symbols.

Alternatively, one time unit may include one or more TTIs.

Alternatively, one time unit may include one or more short transmission time intervals (sTTI).

In this embodiment of the present disclosure, a time-frequency resource used in the communications system 100 for wireless communication may be divided into a plurality of TTIs in time domain. The TTI is a commonly used parameter in an existing communications system (for example, an LTE system), and is a scheduling unit for scheduling data transmission on a radio link. In the prior art, it is usually considered that 1 TTI=1 ms. In other words, one TTI is one subframe or two slots. The TTI is a basic time unit for radio resource management (such as scheduling).

In a communications network, a latency is a key performance indicator, and affects use experience of a user. With development of a communication protocol, a physical layer scheduling interval that most significantly affects the latency is becoming smaller. The scheduling interval (namely, the TTI) is initially 10 ms in WCDMA, then shortened to 2 ms in high speed packet access (HSPA), and shortened to 1 ms in long term evolution (LTE).

A low-latency service requirement requires a shorter TTI frame structure to be introduced for a physical layer, to further shorten the scheduling interval and improve user experience. For example, a TTI length in the LTE system may be shortened from 1 ms to a range from one symbol to one slot (including seven symbols). The symbol mentioned above may be an orthogonal frequency division multiplexing (OFDM) symbol or a single carrier frequency division multiple access (SC-FDMA) symbol in the LTE system, or may be a symbol in another communications system. For another example, a TTI length in a 5G communications system is also shorter than 1 ms.

In the LTE system, in data transmission that is based on a TTI whose length is 1 ms, a round trip time (RTT) of data transmission is usually 8 ms. It is assumed that a processing time is proportionally reduced compared with that for scheduling of the existing TTI whose length is 1 ms. In other words, an existing RTT latency is still followed. In data transmission that is based on an sTTI whose length is 0.5 ms, an RTT of data transmission is 4 ms. A latency can be reduced to half compared with data transmission that is based on the TTI whose length is 1 ms. Therefore, user experience is improved.

A TTI whose length is shorter than 1 ms may be referred to as an sTTI. For example, in the LTE system, a length of the sTTI may be any length from one symbol to seven symbols, or a length of the sTTI may be a combination of at least two different lengths in one symbol to seven symbols. For example, 1 ms includes 6 sTTIs, and lengths of the sTTIs may be three symbols, two symbols, two symbols, two symbols, two symbols, and three symbols; or 1 ms includes 4 sTTIs, and lengths of the sTTIs may be three symbols, four symbols, three symbols, and four symbols, or may be a combination of other different lengths.

Moreover, an uplink sTTI length may be the same as a downlink sTTI length. For example, the uplink sTTI length and the downlink sTTI length each are two symbols.

Alternatively, an uplink sTTI length may be longer than a downlink sTTI length. For example, the uplink sTTI length is seven symbols, and the downlink sTTI length is two symbols.

Alternatively, an uplink sTTI length may be shorter than a downlink sTTI length. For example, the uplink sTTI length is four symbols, and the downlink sTTI length is one subframe.

A data packet whose TTI length is shorter than one subframe or 1 ms is referred to as a short TTI data packet. Short TTI data may be transmitted by using consecutively or inconsecutively distributed resources in frequency domain. It should be noted that, for backward compatibility, both data transmission based on the TTI whose length is 1 ms and data transmission based on the sTTI may coexist in a system.

It should be understood that the foregoing listed structure of the time unit is merely an example for description. This embodiment of the present disclosure is not specially limited thereto, and a structure of the time unit may be randomly changed based on an actual requirement. For example, for an LTE system that does not support the sTTI, one time unit may be one subframe. For another example, for an LTE system that supports the sTTI, one time unit may include one sTTI, or one time unit may include one slot, and one time unit may include one or more (for example, a positive integer quantity of less than 7 or a positive integer quantity of less than 6) symbols. One time unit may alternatively be one subframe.

In this embodiment of the present disclosure, for a plurality of time units, there is a time sequence relationship between the plurality of time units in time domain, and time lengths corresponding to any two time units may be the same or may be different.

Figure 2:
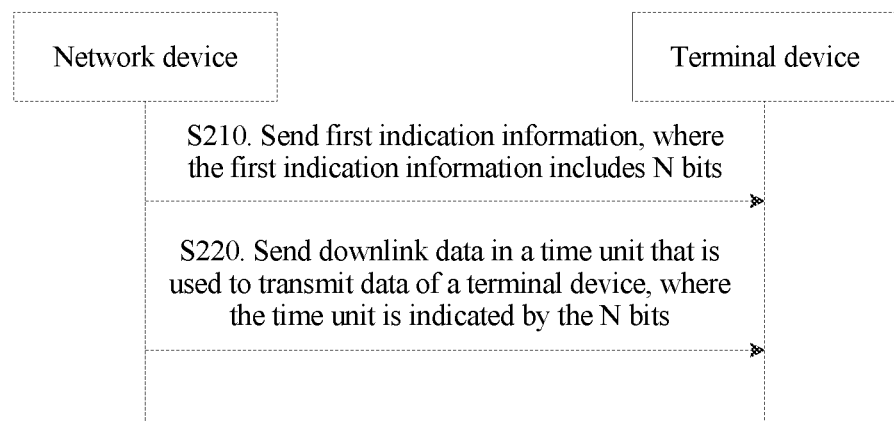
FIG. 2 is a schematic interaction diagram of a data transmission method according to an embodiment of the present disclosure.

The following describes in detail a data transmission method of the embodiments of the present disclosure with reference to FIG. 2. FIG. 2 is a schematic interaction diagram of a data transmission method according to an embodiment of the present disclosure.

In S210, a network device sends first indication information, where the first indication information includes N bits, the N bits are corresponding to M time units, the M time units are corresponding to at least one time length, a value of each bit is used to indicate whether a corresponding time unit is used to transmit data of a terminal device, M is an integer greater than or equal to 1, and N is an integer greater than or equal to 1.

In short, in this embodiment of the present disclosure, a bitmap manner is used to indicate a time unit (or a time domain resource) used to transmit the data of the terminal device.

Specifically, for the M time units, there is a time sequence relationship between the M time units. The M time units may be consecutive or inconsecutive in time domain. The "inconsecutive" means that some time units are used for another purpose and cannot be used to transmit the data of the terminal device. Specific time units that may be used to transmit the data of the terminal device may be notified by using higher layer signaling. Specific notification content may be a time unit reserved for another purpose or available time units. Each of the M time units may be corresponding to a same time length, or time lengths corresponding to the M time units may be at least partially the same, in other words, the M time units are corresponding to at least one time length.

A correspondence between the N bits and the M time units (denoted as a correspondence #1 for ease of distinguishing and understanding) may be a one-to-one correspondence. In other words, one bit is corresponding to one time unit, and in this case, N=M. Alternatively, the correspondence #1 may be a one-to-many correspondence. In other words, one bit may be corresponding to at least two time units, and a location of each time unit in time domain is corresponding to a location of a corresponding bit in the N bits. Alternatively, the correspondence #1 may be a many-to-one correspondence. In other words, a plurality of bits are jointly corresponding to different frequency domain units of one time unit.

It should be noted that a value of each bit is used to indicate whether a corresponding time unit is used to transmit the data of the terminal device. To be specific, a value of each bit indicates only that a corresponding time unit is used to transmit data of a terminal device, and does not indicate whether the time unit is used to transmit data of another terminal device. If a time unit is used to transmit data, but the time unit is not used to transmit the data for the terminal device, a value of a bit that is corresponding to the time unit and that is in indication information #1 sent by the network device to the terminal device means that the time unit is not used to transmit the data of the terminal device.

For example, "0" may indicate that the corresponding time unit is not used to transmit the data for the terminal device, and "1" may indicate that the corresponding time unit is used to transmit the data for the terminal device. Alternatively, "1" may indicate that the corresponding time unit is not used to transmit the data for the terminal device, and "0" may indicate that the corresponding time unit is used to transmit the data for the terminal device.

Further, in S210, the terminal device receives the indication information #1, so as to determine, based on the indication information #1, a time unit that carries the data to be transmitted to the terminal device.

In S220, the network device sends downlink data in a time unit that is used to transmit the data of the terminal device, where the time unit is indicated by the N bits.

Further, in S220, the terminal device receives the downlink data in the determined time unit that is used to transmit the data of the terminal device.

Therefore, according to the data transmission method in this embodiment of the present disclosure, the network device sends the first indication information to the terminal device, where the N bits included in the first indication information are corresponding to the M time units, the M time units are corresponding to at least one time length, and a value of each bit is used to indicate whether a corresponding time unit is used to transmit the data for the terminal device, that is, a bitmap manner is used to indicate a time unit for transmitting the data of the terminal device. This allows the network device to use a unified time domain resource indication manner in different application scenarios that support time units of different time lengths, thereby improving system flexibility.

For example, if a time length of a time unit supported by a system is relatively short, one bit may be corresponding to a time unit of a short time length. If a time length of a time unit supported by a system is relatively long, one bit may be corresponding to a time unit of a relatively long time length. If a system supports time units of different time lengths, one bit may be corresponding to a time unit of a shorter time length, and another bit may be corresponding to a time unit of a longer time length.

Optionally, the method further includes:

sending, by the network device, downlink control information DCI to the terminal device, where the DCI includes the first indication information.

To be specific, the indication information #1 is carried in the DCI, and the network device indicates, by sending the DCI, a time unit used to transmit the data of the terminal device.

Optionally, the M time units are consecutive in time domain.

Figure 6:
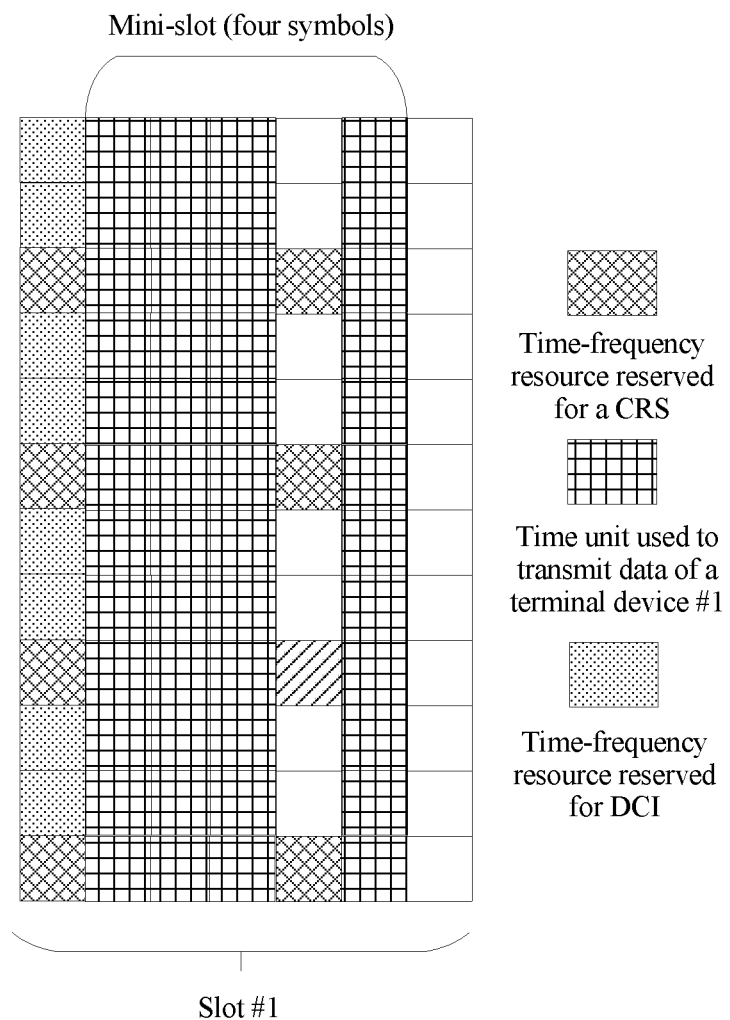
FIG. 6 is a schematic structural diagram of a time unit used to transmit data of a terminal device in an LTE/NR coexistence scenario.

As an example instead of a limitation, as described above, the M time units may alternatively be inconsecutive in time domain, two adjacent time units are separated by some time units used to transmit other data, and time units specifically included in the M time units may be determined based on higher layer signaling. Referring to FIG. 6, it may be assumed that one slot has seven symbols, and that a first symbol and a fifth symbol are time units reserved by the system for another purpose (for example, used for transmitting control signaling or transmitting a reference signal). It may be determined that the M time units are only a second symbol, a third symbol, a fourth symbol, a sixth symbol, and a seventh symbol, in other words, M=5, and the first symbol and the fifth symbol are directly skipped when a bitmap is used to indicate a time unit for transmitting the data of the terminal device.

For example, if values of bits are (1 1 1 1 0), the first bit is corresponding to the second symbol, the second bit is corresponding to the third symbol, the third bit is corresponding to the fourth symbol, the fourth bit is corresponding to the sixth symbol, and the fifth bit is corresponding to the seventh symbol.

In this embodiment of the present disclosure, there are two cases in which a bitmap manner is used to indicate a time unit for transmitting the data for the terminal device. The following separately describes the two cases in detail.

Case 1

Optionally, the N bits include P1 consecutive bits and Q1 consecutive bits, N=P1+Q1, and M is greater than or equal to N, where M=M1+M2, the P1 consecutive bits are corresponding to M1 time units, the Q1 consecutive bits are corresponding to M2 time units, each of the M1 time units is corresponding to a first time length, each of the M2 time units is corresponding to a second time length, and the first time length is different from the second time length.

Specifically, the N bits include two parts of bits: a first part of bits, namely the P1 consecutive bits, and a second part of bits, namely the Q1 consecutive bits, where N=P1+Q1. In other words, the P1 consecutive bits and the Q1 consecutive bits do not overlap, that is, the P1 consecutive bits and the Q1 consecutive bits have no overlapping bits. It can also be understood as that a last bit in the P1 consecutive bits is immediately next to the first bit in the Q1 consecutive bits, or a last bit in the Q1 consecutive bits is immediately next to the first bit in the P1 consecutive bits.

That M is greater than or equal to N indicates that one bit may be corresponding to at least one time length, which means one bit is corresponding to one time unit or one bit may be corresponding to a plurality of time units. This is not limited in this embodiment of the present disclosure.

It should be understood that P1 or Q1 may be 0. When P1=0, N=Q1 and M=M2, which means all the N bits are corresponding to the M time units whose time lengths are the second time length. When Q1=0, N=P1 and M=M1, which means all the N bits are corresponding to the M time units whose time lengths are the first time length.

It should be understood that the M1 time units do not overlap with the M2 time units in time domain, all the M1 time units are located before the M2 time units in time domain, and a first time unit in the M2 time units is a time unit immediately next to a last time unit in the M1 time units. Alternatively, all the M1 time units are located after the M2 time units in time domain, and a first time unit in the M1 time units is a time unit immediately next to a last time unit in the M2 time units.

In this embodiment of the present disclosure, time lengths of any two of the M1 time units are the same, in other words, each of the M1 time units is corresponding to a same time length, namely, a time length #1 (which is an example of the first time length). Similarly, time lengths of any two of the M2 time units are the same, in other words, the M2 time units are corresponding to a same time length, namely, a time length #2 (which is an example of the second time length).

The time length #1 is different from the time length #2, and the time length #1 may be shorter than the time length #2, or the time length #1 may be longer than the time length #2. This is not limited in this embodiment of the present disclosure.

For example, the time length #1 is a time length corresponding to one symbol, in other words, each of the M1 time units is a time length corresponding to one symbol; and the time length #2 is a time length corresponding to one slot, in other words, each of the M2 time units is a time length corresponding to one slot.

In this way, the N bits are divided into the P1 consecutive bits and the Q1 consecutive bits, and the M time units are divided into the M1 time units and the M2 time units, so that the P1 bits are corresponding to the M1 time units, and the Q1 bits are corresponding to the M2 time units. The first time length corresponding to the M1 time units is different from the second time length corresponding to the M2 time units. In this way, a relatively small quantity of bits can be used to indicate a relatively long time length, thereby effectively reducing bits (or a quantity of bits) in the first indication information, or in other words, reducing signaling overheads.

Optionally, a last time unit in the M1 time units is located before a first time unit in the M2 time units in time domain, and the first time length is shorter than the second time length.

In other words, all the M1 time units are located before the M2 time units in time domain, and the time length #1 corresponding to the M1 time units is shorter than the time length #2 corresponding to the M2 time units.

Optionally, the M1 time units belong to one slot.

To be specific, the M1 time units may be some symbols in one slot or may be one slot.

As an example instead of a limitation, time lengths of the M1 time units may alternatively be time lengths corresponding to some symbols in at least two adjacent slots.

For example, a slot #1 and a slot #2 are consecutive in time domain, and each slot has seven symbols. The time length #1 is a time length corresponding to one symbol, and M1 is 4. In this case, the first two symbols of the four time units (namely, four symbols) are located at locations of the last two symbols of the slot #1, and the last two symbols of the four time units are located at locations of the first two symbols of the slot #2.

Optionally, the first time length is a time length corresponding to one symbol, and the second time length is a time length corresponding to one slot.

In other words, a time length corresponding to each of the M1 time units is a time length corresponding to one symbol, which means each of the M1 time units is one symbol. Similarly, a time length corresponding to each of the M2 time units is a time length corresponding to one slot, which means each of the M2 time units is one slot.

With reference to FIG. 3 to FIG. 7, the following describes in detail a manner of indicating a time unit for transmitting data in the embodiments of the present disclosure by using a specific structure of a time unit in five application scenarios.

For ease of description, that the time length #1 is corresponding to a length of one symbol, and the time length #2 is corresponding to a length of one slot is used as an example to describe the embodiments of the present disclosure in detail.

In addition, in the following embodiment, it is assumed that P1=M1=7, 7 is a quantity of OFDM symbols included in one slot, Q1=M2=a maximum quantity of aggregated slots (namely, a maximum quantity of aggregations)−1, and the maximum quantity of aggregations is 4. Then, Q1=M2=3, and N=M=10.

In addition, in the following embodiment, "0" indicates that the network device does not use the time unit to transmit the data of the terminal device, and "1" indicates that the network device uses the time unit to transmit the data for the terminal device.

Scenario 1

Figure 3:
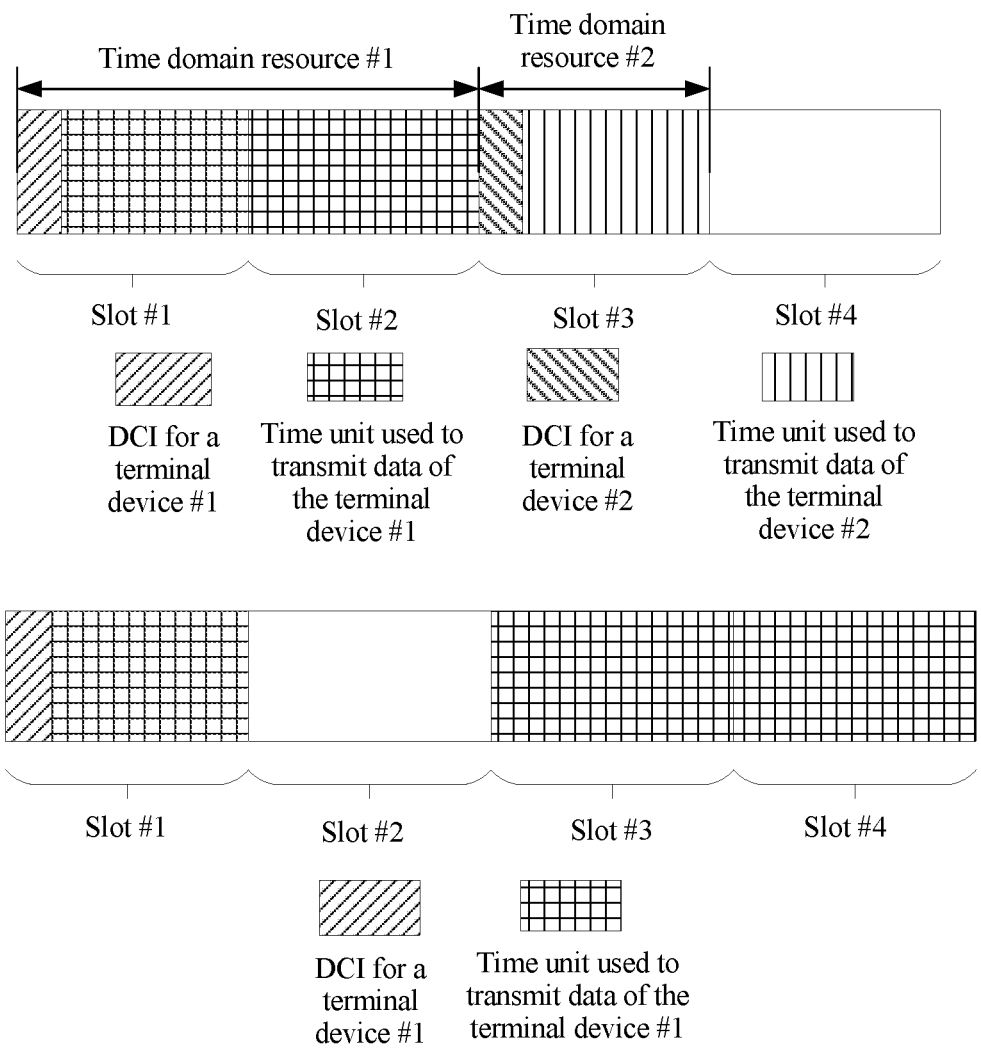
FIG. 3 is a schematic structural diagram of a time unit used to transmit data of a terminal device in a slot-based scheduling scenario.

FIG. 3 is a schematic structural diagram of a time unit used to transmit data of a terminal device in a slot-based scheduling scenario.

In the first diagram in FIG. 3, a time unit used to transmit data may be one or more slots, each of the M1 time units is one symbol, each of the M2 time units is one slot, and slots used to transmit the data of the terminal device are consecutive in time domain.

For a terminal device #1 (which is an example of the terminal device), values of 10 bits are (0 1 1 1 1 1 1 1 0 0), seven symbols corresponding to the first 7 bits are the M1 time units, indicating that the last six symbols in a slot #1 are used to transmit data of the terminal device #1, and three slots corresponding to the last 3 bits are the M2 time units, indicating that among a slot #2, a slot #3, and a slot #4, the slot #2 is used to transmit the data of the terminal device #1, and the slot #3 and the slot #4 are not used to transmit the data of the terminal device #1.

It should be noted that a first symbol in the slot #1 is a symbol that carries indication information (denoted as indication information #1A) for the terminal device #1.

Similarly, for a terminal device #2 (which is another example of the terminal device), values of 10 bits are (0 1 1 1 1 1 0 0 0), seven symbols corresponding to the first 7 bits are the M1 time units, indicating that the last six symbols in the slot #3 are used to transmit data of the terminal device #2, and three slots corresponding to the last 3 bits are the M2 time units, indicating that the slot #4, a slot #5, and a slot #6 (the slot #5 and the slot #6 are not shown in the figure) are not used to transmit the data of the terminal device #2.

It should be noted that a first symbol in the slot #3 is a symbol that carries indication information (denoted as indication information #1B) for the terminal device #2.

In the second diagram in FIG. 3, a time unit used to transmit data may be one or more slots, each of the M1 time units is one symbol, each of the M2 time units is one slot, and slots used to transmit the data of the terminal device may be inconsecutive in time domain, to be specific, slots used to transmit data of a terminal device #1 are a first slot, a third slot, and a fourth slot.

In this case, values of 10 bits are (0 1 1 1 1 1 1 0 1 1), seven symbols corresponding to the first 7 bits are the M1 time units, indicating that the last six symbols in the slot #1 are used to transmit the data of the terminal device #1, and three slots corresponding to the last 3 bits are the M2 time units, indicating that among the slot #2, the slot #3, and the slot #4, the slot #2 is not used to transmit the data of the terminal device, and the slot #3 and the slot #4 are used to transmit the data of the terminal device #1.

It should be further noted that in this scenario, any one of P1 and Q1 may be 0. In other words, time units corresponding to the N bits are corresponding to a same time length. Specially, P1 may be set to 0. In this way, the N bits indicate only a time unit corresponding to a relatively long time length (namely, the time length #2), thereby reducing signaling overheads more effectively.

For example, in the first diagram in FIG. 3, when P1=0, and Q1=a maximum quantity of aggregated slots, for example, 4, N=4, four bits are used to indicate a time unit for transmitting the data of the terminal device, and each bit is corresponding to one slot.

For the terminal device #1, values of the four bits are (1 1 0 0), slots corresponding to the four bits are the M2 time units, indicating that the slot #1 and the slot #2 are used to transmit the data of the terminal device #1, and the slot #3 and the slot #4 are not used to transmit the data of the terminal device #1.

For the terminal device #2, values of the four bits are (1 0 0 0), slots corresponding to the four bits are the M2 time units, indicating that the slot #3 is used to transmit the data of the terminal device #2, and the slot #4, the slot #5, and the slot #6 are not used to transmit the data of the terminal device #1.

Scenario 2

Figure 4:
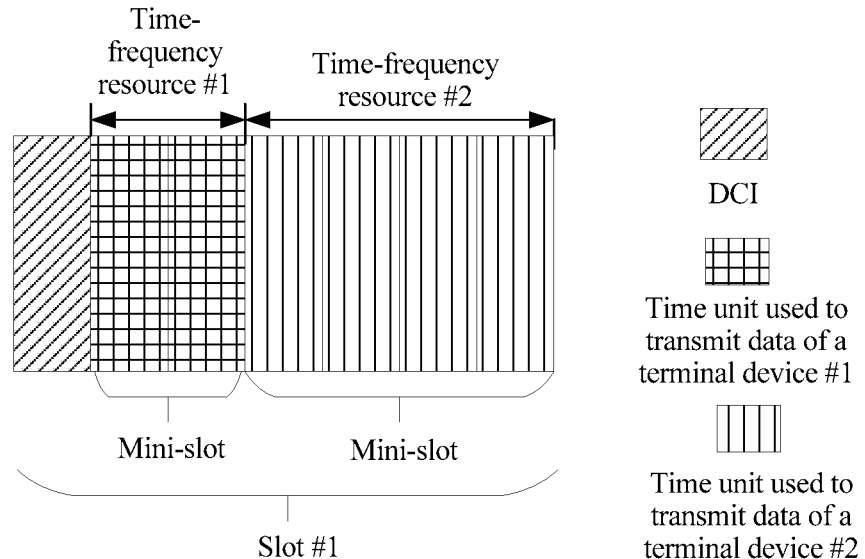
FIG. 4 is a schematic structural diagram of a time unit used to transmit data of a terminal device in a mini-slot-based URLLC scheduling scenario.

FIG. 4 is a schematic structural diagram of a time unit used to transmit data of a terminal device in a mini-slot-based URLLC scheduling scenario.

As shown in FIG. 4, in this scenario, a time unit used to transmit data may be one mini-slot, each of the M1 time units is one symbol, and each of the M2 time units is one slot.

For brevity, only a case in which a time unit for transmitting data in one slot is occupied is drawn in the figure.

For a terminal device #1, values of 10 bits are (0 1 1 0 0 0 0 0 0 0), seven symbols corresponding to the first 7 bits are the M1 time units, indicating that a second symbol and a third symbol in the slot #1 are used to transmit data of the terminal device #1, and three slots corresponding to the last 3 bits are the M2 time units, indicating that the slot #2, the slot #3, and the slot #4 (the slot #2, the slot #3, and the slot #4 are not shown) are not used to transmit the data of the terminal device #1.

It should be noted that the first symbol in the slot #1 carries indication information #1A for the terminal device #1.

Similarly, for a terminal device #2, values of 10 bits are (0 0 0 1 1 1 1 0 0 0), seven symbols corresponding to the first 7 bits are the M1 time units, indicating that the last four symbols in the slot #1 are used to transmit data of the terminal device #2, and three slots corresponding to the last 3 bits are the M2 time units, indicating that the slot #2, the slot #3, and the slot #4 (the slot #2, the slot #3, and the slot #4 are not shown) are not used to transmit the data of the terminal device #2.

It should be noted that in this scenario, any one of P1 and Q1 may be 0. In other words, time units corresponding to the N bits are corresponding to a same time length. Specially, Q1 may be set to 0. In this way, the N bits indicate only a time unit corresponding to a relatively short time length (namely, the time length #1), thereby reducing signaling overheads more effectively.

For example, in FIG. 4, when Q1=0, and P1=a quantity of symbols in one slot, for example, 7, N=7, seven bits are used to indicate a time unit for transmitting the data of the terminal device, and each bit is corresponding to one symbol.

For the terminal device #1, values of the 7 bits are (0 1 1 0 0 0 0), seven symbols corresponding to the 7 bits are the M1 time units, indicating that the second symbol and the third symbol in the slot #1 are used to transmit the data of the terminal device #1.

For the terminal device #2, values of the 7 bits are (0 0 0 1 1 1 1), seven symbols corresponding to the 7 bits are the M1 time units, indicating that the last four symbols in the slot #1 are used to transmit the data of the terminal device #2.

Scenario 3

Figure 5:
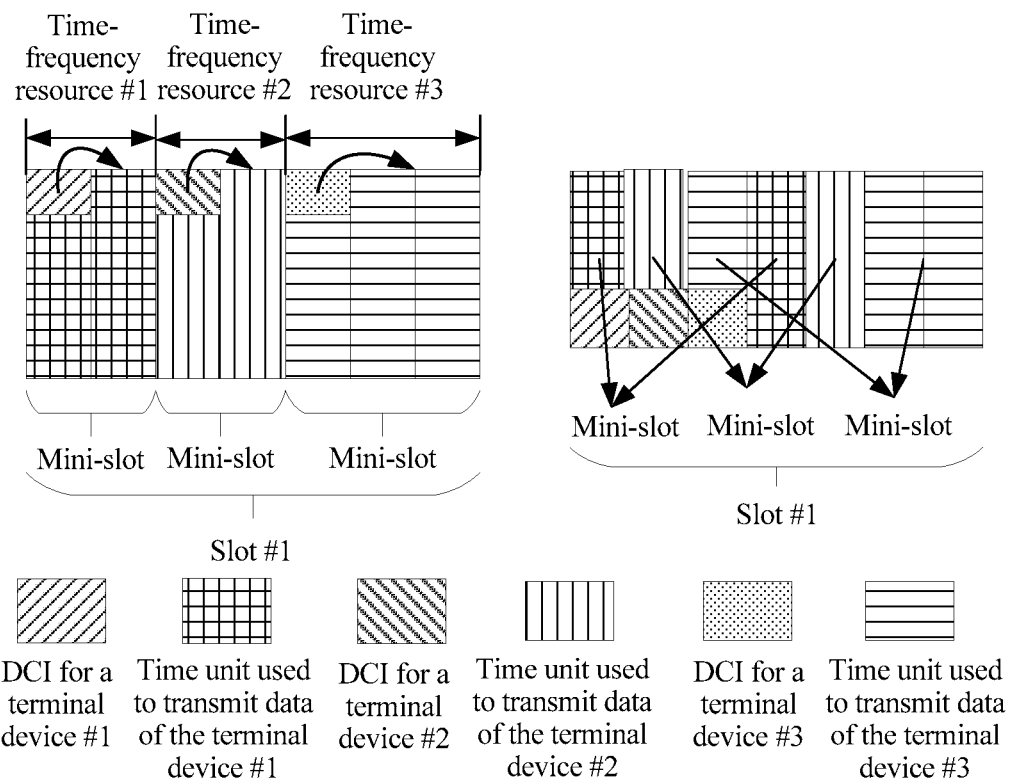
FIG. 5 is a schematic structural diagram of a time unit used to transmit data of a terminal device in a scenario that is based on a frequency band higher than or equal to 6 GHz.

FIG. 5 is a schematic structural diagram of a time unit used to transmit data of a terminal device in a scenario that is based on a frequency band higher than or equal to 6 GHz.

As shown in FIG. 5, in this scenario, a time unit used to transmit data may be one mini-slot, and symbols that are included in one mini-slot and that are used to transmit data are inconsecutive. Each of the M1 time units is one symbol, and each of the M2 time units is one slot.

For brevity, only a case in which a time unit for transmitting data in one slot is occupied is drawn in the figure.

As indicated in the first diagram in FIG. 5, a control channel and a corresponding data channel are sent by using a same beam, and a resource that is not used by the control channel may be used to send data.

For a terminal device #1, values of 10 bits are (1 1 0 0 0 0 0 0 0 0), seven symbols corresponding to the first 7 bits are the M1 time units, indicating that a first symbol and a second symbol in the slot #1 are used to transmit data of the terminal device #1, and three slots corresponding to the last 3 bits are the M2 time units, indicating that the slot #2, the slot #3, and the slot #4 (the slot #2, the slot #3, and the slot #4 are not shown) are not used to transmit the data of the terminal device #1.

For a terminal device #2, values of 10 bits are (0 0 1 1 0 0 0 0 0 0), seven symbols corresponding to the first 7 bits are the M1 time units, indicating that a third symbol and a fourth symbol in the slot #1 are used to transmit data of the terminal device #2, and three slots corresponding to the last 3 bits are the M2 time units, indicating that the slot #2, the slot #3, and the slot #4 (the slot #2, the slot #3, and the slot #4 are not shown) are not used to transmit the data of the terminal device #2.

In the second diagram in FIG. 5, the network device first sends a control channel, and then sends a data channel, and a resource that is not used by the control channel may be used to send data. In this scenario, symbols that are included in one mini-slot and that are used to transmit data are inconsecutive.

For a terminal device #1, values of 10 bits are (1 0 0 1 0 0 0 0 0 0), seven symbols corresponding to the first 7 bits are the M1 time units, indicating that a first symbol and a fourth symbol in the slot #1 are used to transmit data of the terminal device #1, and three slots corresponding to the last 3 bits are the M2 time units, indicating that the slot #2, the slot #3, and the slot #4 (the slot #2, the slot #3, and the slot #4 are not shown) are not used to transmit the data of the terminal device #1.

For a terminal device #2, values of 10 bits are (0 1 0 0 1 0 0 0 0 0), seven symbols corresponding to the first 7 bits are the M1 time units, indicating that a second symbol and a fifth symbol in the slot #1 are used to transmit data of the terminal device #2, and three slots corresponding to the last 3 bits are the M2 time units, indicating that the slot #2, the slot #3, and the slot #4 (the slot #2, the slot #3, and the slot #4 are not shown) are not used to transmit the data of the terminal device #2.

It should be noted that in this scenario, any one of P1 and Q1 may be 0. In other words, time units corresponding to the N bits are corresponding to a same time length. Specially, Q1 may be set to 0. In this way, the N bits indicate only a time unit corresponding to a relatively short time length (namely, the time length #1), thereby reducing signaling overheads more effectively.

For example, in the second diagram in FIG. 5. when Q1=0, and P1=a quantity of symbols in one slot, for example, 7, N=7, seven bits are used to indicate a time unit for transmitting the data of the terminal device, and each bit is corresponding to one symbol.

For the terminal device #1, values of the 7 bits are (1 0 0 1 0 0 0), and seven symbols corresponding to the 7 bits are the M1 time units, indicating that a first symbol and a fourth symbol in the slot #1 are used to transmit the data of the terminal device #1.

For the terminal device #2, values of the 7 bits are (0 1 0 0 1 0 0), seven symbols corresponding to the 7 bits are the M1 time units, indicating that a second symbol and a fifth symbol in the slot #1 are used to transmit the data of the terminal device #2.

In all scenarios of all cases in this embodiment of the present disclosure, any one of P1 and Q1 may be 0. In other words, time units corresponding to the N bits are corresponding to a same time length. Details are not described again in this embodiment.

Scenario 4

FIG. 6 is a schematic structural diagram of a time unit used to transmit data of a terminal device in an LTE/NR coexistence scenario.

As shown in FIG. 6, in this scenario, a time unit used to transmit data may be one mini-slot, and symbols that are included in one mini-slot and that are used to transmit data are inconsecutive. Each of the M1 time units is one symbol, and each of the M2 time units is one slot.

For brevity, only a case in which a time unit for transmitting data in one slot is occupied is drawn in the figure.

For a terminal device #1, values of 10 bits are (0 1 1 1 0 1 0 0 0 0), seven symbols corresponding to the first 7 bits are the M1 time units, indicating that a second symbol, a third symbol, a fourth symbol, and a sixth symbol in the slot #1 are used to transmit data of the terminal device #1, and three slots corresponding to the last 3 bits are the M2 time units, indicating that the slot #2, the slot #3, and the slot #4 (the slot #2, the slot #3, and the slot #4 are not shown) are not used to transmit the data of the terminal device #1.

Scenario 5

Figure 7:
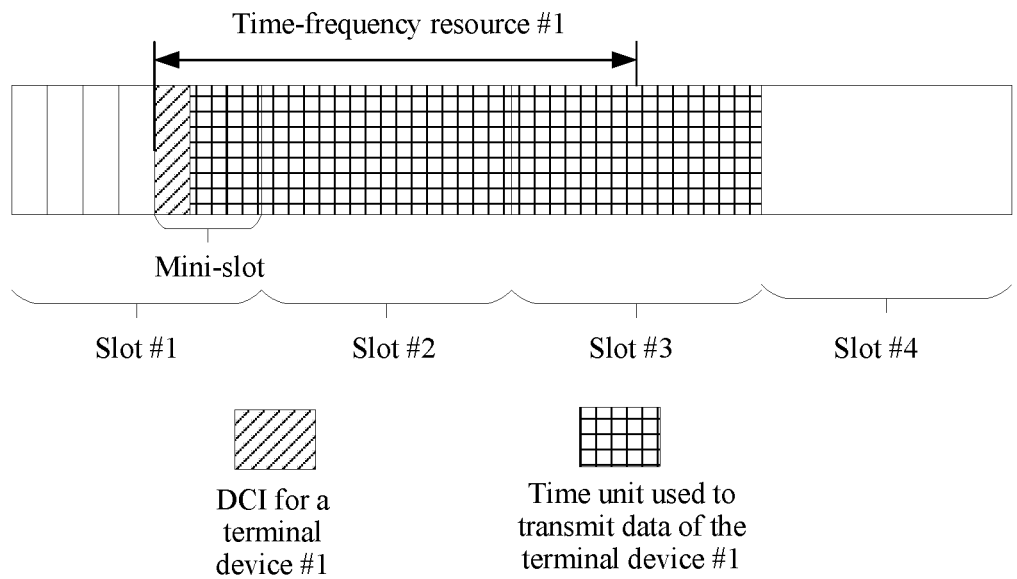
FIG. 7 is a schematic structural diagram of a time unit used to transmit data of a terminal device in a scenario of an unlicensed frequency band.

FIG. 7 is a schematic structural diagram of a time unit used to transmit data of a terminal device in a scenario of an unlicensed frequency band.

As shown in FIG. 7, in this scenario, a time unit used to transmit data may be an aggregation of a plurality of mini-slots and a plurality of slots. Each of the M1 time units is one symbol, and each of the M2 time units is one slot.

For a terminal device #1, values of 10 bits are (0 0 0 0 0 1 1 1 1 0), seven symbols corresponding to the first 7 bits are the M1 time units, indicating that a sixth symbol and a seventh symbol in the slot #1 are used to transmit data of the terminal device #1, and three slots corresponding to the last 3 bits are the M2 time units, indicating that the slot #2 and the slot #3 of the slot #2, the slot #3, and the slot #4 are used to transmit the data of the terminal device #1, and the slot #4 is not used to transmit the data of the terminal device #1.

The foregoing describes in detail this embodiment of the present disclosure by using an example in which one slot includes seven symbols. In the following, that one slot includes 14 symbols is used to describe the embodiments of the present disclosure briefly. For brevity, only Scenario 1 and Scenario 4 are described. Bit indication manners in other scenarios are similar to those in Scenario 1 and Scenario 4. Details are not described herein again.

Similarly, it is assumed that P1=M1=14, 14 is a quantity of OFDM symbols included in one slot, Q1=M2=a maximum quantity of aggregated slots (namely, a maximum quantity of aggregations)−1, and the maximum quantity of aggregations is 4. Then, Q1=M2=3, and N=17. In addition, in the following embodiment, "0" indicates that the network device does not occupy the time unit to transmit the data of the terminal device, and "1" indicates that the network device occupies the time unit to transmit the data for the terminal device.

Scenario 1

Figure 8:
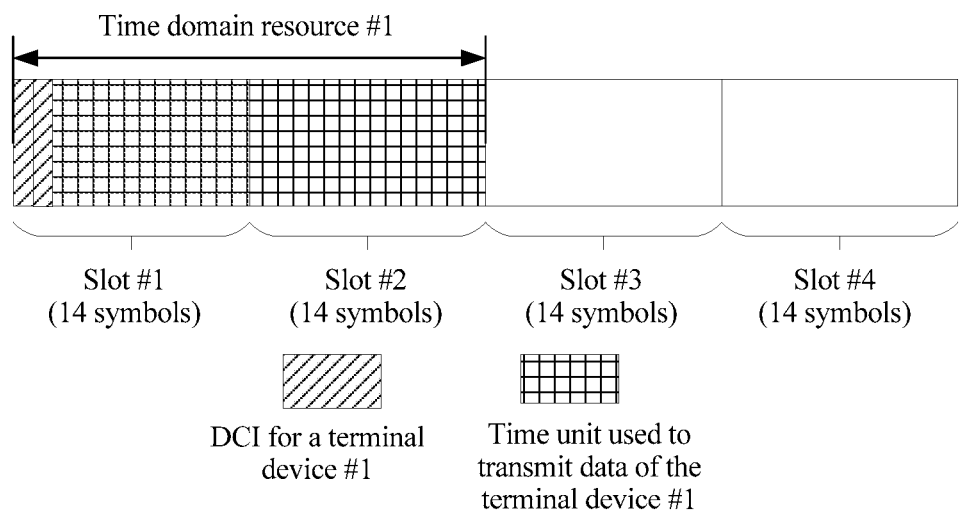
FIG. 8 is another schematic structural diagram of a time unit used to transmit data of a terminal device in a slot-based scheduling scenario.

FIG. 8 is another schematic structural diagram of a time unit used to transmit data of a terminal device in a slot-based scheduling scenario.

In this scenario, one slot includes 14 symbols, a time unit used to transmit data may be one or more slots, each of the M1 time units is one symbol, each of the M2 time units is one slot, and slots used to transmit the data of the terminal device are consecutive.

First indication manner: N=M=17

In this case, the N bits are in a one-to-one correspondence with the M time units, that is, one bit is corresponding to one time unit.

For example, for a terminal device #1, values of 17 bits are (0 0 1 1 1 1 1 1 1 1 1 1 1 1 1 0 0), 14 symbols corresponding to the first 14 bits are the M1 time units, indicating that the last 12 symbols in the slot #1 are used to transmit data of the terminal device #1, and three slots corresponding to the last 3 bits are the M2 time units, indicating that among the slot #2, the slot #3, and the slot #4, the slot #2 is used to transmit the data of the terminal device, and the slot #3 and the slot #4 are not used to transmit the data of the terminal device #1.

Second indication manner: Each of the P1 bits is corresponding to two time units (N=10, M=17, N<M).

In this case, the N bits are in a one-to-many correspondence with the M time units, that is, one bit is corresponding to two time units. Herein, each of the P1 bits is corresponding to two of the M1 time units, and each of the Q1 bits is corresponding to one of the M2 time units.

For example, for a terminal device #1, values of 10 bits are (0 1 1 1 1 1 1 1 0 0), 14 symbols corresponding to the first 7 bits are the M1 time units, indicating that the last 12 symbols in the slot #1 are used to transmit data of the terminal device #1, and three slots corresponding to the last 3 bits are the M2 time units, indicating that among the slot #2, the slot #3, and the slot #4, the slot #2 is used to transmit the data of the terminal device, and the slot #3 and the slot #4 are not used to transmit the data of the terminal device #1.

Certainly, for the Q1 bits, each bit may also indicate two time units. This is not limited in this embodiment of the present disclosure.

Scenario 4

Figure 9:
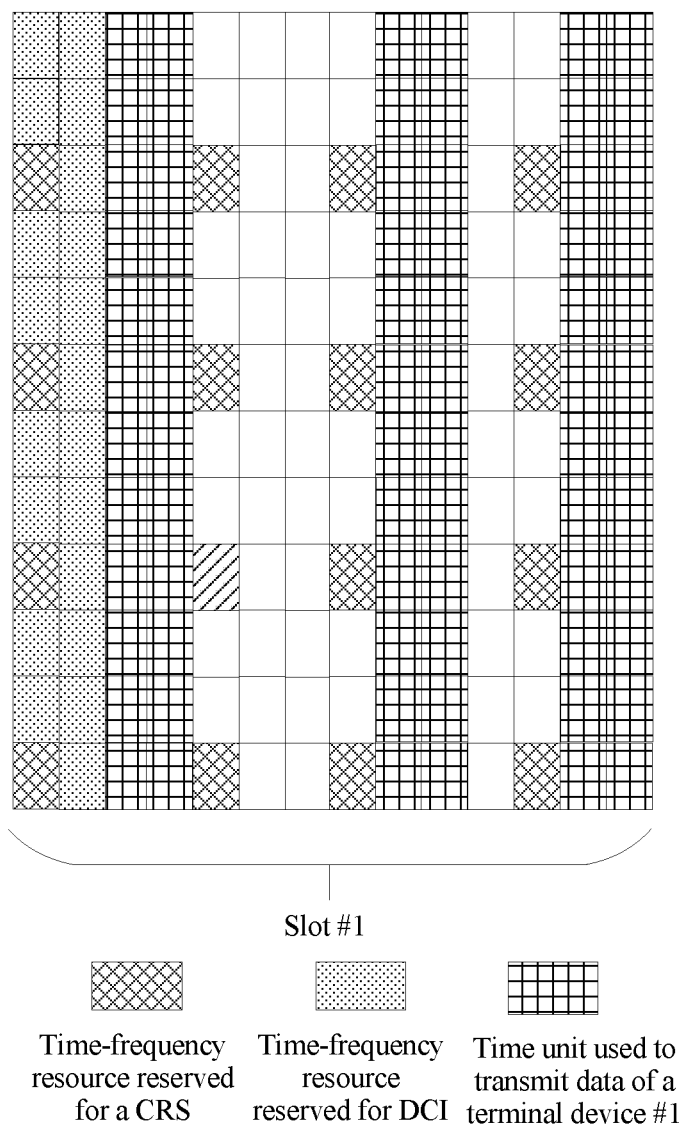
FIG. 9 is another schematic structural diagram of a time unit used to transmit data of a terminal device in an LTE/NR coexistence scenario.

FIG. 9 is another schematic structural diagram of a time unit used to transmit data of a terminal device in an LTE/NR coexistence scenario.

As shown in FIG. 9, in this scenario, one slot includes 14 symbols, a time unit used to transmit data may be one mini-slot, and symbols that are included in one mini-slot and that are used to transmit data are inconsecutive. Each of the M1 time units is one symbol, and each of the M2 time units is one slot.

First indication manner: one bit is corresponding to one time unit (N=M=17).

In this case, the N bits are in a one-to-one correspondence with the M time units, that is, one bit is corresponding to one time unit.

For example, for a terminal device #1, values of 10 bits are (0 0 1 1 0 0 0 0 1 1 0 0 1 1 0 0 0), 14 symbols corresponding to the first 14 bits are the M1 time units, indicating that a third symbol, a fourth symbol, a ninth symbol, a tenth symbol, a thirteenth symbol, and a fourteenth symbol in the slot #1 are used to transmit data of the terminal device #1, and three slots corresponding to the last 3 bits are the M2 time units, indicating that the slot #2, the slot #3, and the slot #4 (the slot #2, the slot #3, and the slot #4 are not shown) are not used to transmit the data of the terminal device #1.

Second indication manner: Each of the P1 bits is corresponding to two time units (N=10, M=17, N<M).

In this case, the N bits are in a one-to-many correspondence with the M time units, that is, one bit is corresponding to two time units. Herein, each of the P1 bits is corresponding to two of the M1 time units, and each of the Q1 bits is corresponding to one of the M1 time units.

For example, for a terminal device #1, values of 10 bits are (0 1 0 0 1 0 1 1 0 0), 14 symbols corresponding to the first 7 bits are the M1 time units, indicating that a third symbol, a fourth symbol, a ninth symbol, a tenth symbol, a thirteenth symbol, and a fourteenth symbol in the slot #1 are used to transmit data of the terminal device #1, and three slots corresponding to the last 3 bits are the M2 time units, indicating that among the slot #2, the slot #3, and the slot #4, the slot #2 is used to transmit the data of the terminal device, and the slot #3 and the slot #4 are not used to transmit the data of the terminal device #1.

Certainly, for the Q1 bits, each bit may also indicate two time units. This is not limited in this embodiment of the present disclosure. In addition, in a scenario of a relatively large subcarrier spacing, for example, of 30 kHz or 60 kHz, because there are a relatively large quantity of symbols and slots in one subframe, proper configuration may be performed by using higher layer signaling or dynamic signaling so that N<M, that is, one bit is corresponding to a plurality of time units, thereby reducing signaling overheads.

In this embodiment of the present disclosure, it can also be understood as that, regardless of whether a time unit that is supported by the system and that is used to transmit data is a frame, a subframe, a slot, or a slot aggregation, in this embodiment of the present disclosure, a time unit of a relatively short time length included in the time unit that is used to transmit data may be used to indicate, in a bitmap manner, an occupation status of a time unit that is used to transmit the data for the terminal device.

Optionally, the method further includes:

sending, by the network device, fourth indication information, where the fourth indication information is used to determine a symbol that is in each of the M2 time units and that is used to transmit the data for the terminal device.

To be specific, because the time length #2 corresponding to the M2 time units is relatively long, and each time unit includes at least two symbols, when a time unit indicated by a value of each of the Q1 bits is used to transmit the data of the terminal device, but not all symbols may be used to transmit the data of the terminal device, indication information #4 (which is an example of the fourth indication information) may be used to determine which symbols in each of the M2 time units are used to transmit the data of the terminal device.

Four slots are still used as an example. Each slot includes seven symbols, each of the M1 time units is one symbol, and each of the M2 time units is one slot.

For example, the indication information #4 indicates that an occupation status of symbols in each of the slot #2, the slot #3, and the slot #4 is the same as that of the slot #1.

For another example, the indication information #4 indicates that all symbols in each of the slot #2, the slot #3, and the slot #4 are occupied.

For still another example, the indication information #4 indicates a symbol (for example, a symbol used to carry control information or a symbol used to transmit a reference signal) reserved by the system in each of the slot #2, the slot #3, and the slot #4, wherein the symbol can not be used to transmit data.

Optionally, the method further includes:

sending, by the network device, second indication information, where the second indication information is used to indicate at least one of the following values: N, P1, or Q1.

In other words, the network device may indicate N, P1, or Q1 by using indication information #2 (which is an example of the second indication information). In this way, the terminal device can determine at least one of N, P1, or Q1 based on the indication information #2.

The indication information #2 may be dynamic signaling, semi-static signaling, or static signaling. This is not specially limited in this embodiment of the present disclosure.

It should be noted that when the indication information #2 indicates only one of the values, one of the other two values may be specified in a protocol, and the remaining value may be determined based on a relationship between the two values and a relationship between the three values. When the indication information #2 indicates two of the values, the remaining value may also be determined based on a relationship between the two values and a relationship between the three values.

When all the three values are specified in the protocol, the network device does not need to indicate N, P1, or Q1 by using signaling.

Optionally, the method includes:

sending, by the network device, fifth indication information, where the fifth indication information is used to indicate at least one of the following values: M, M1, or M2.

Similarly, indication information #5 (which is an example of the fifth indication information) may be dynamic signaling, semi-static signaling, or static signaling. This is not specially limited in this embodiment of the present disclosure.

It should be noted that when the indication information #5 indicates only one of the values, one of the other two values may be specified in a protocol, and the remaining value may be determined based on a relationship between the two values and a relationship between the three values. When the indication information #5 indicates two of the values, the remaining value may also be determined based on a relationship between the two values and a relationship between the three values.

When all the three values are specified in the protocol, the network device does not need to indicate M, M1, or M2 by using signaling.

Case 2

Optionally, the N bits are divided into L groups, each of the L groups includes M consecutive bits, L is a quantity of frequency domain units, the $j^{th}$ bit in an $i^{th}$ group is corresponding to a $j^{th}$ time unit in an $i^{th}$ frequency domain unit, the $i^{th}$ group belongs to the L groups, the $i^{th}$ frequency domain unit belongs to L frequency domain units, $i \in [1, L]$, $j \in [1, M]$, each of the M time units is corresponding to a third time length, M is less than or equal to N, and L is an integer greater than or equal to 1.

Alternatively, the N bits are divided into M groups, each of the M groups includes L consecutive bits, L is a quantity of frequency domain units, the $j^{th}$ bit in an $i^{th}$ group is corresponding to a $i^{th}$ frequency domain unit in an $i^{th}$ time unit, the $i^{th}$ group belongs to the M groups, the $i^{th}$ time unit belongs to the M time units, $i \in [1, M]$, $j \in [1, L]$, each of the M time units is corresponding to a fourth time length, M is less than or equal to N, and L is an integer greater than or equal to 1.

Specifically, the N bits are divided into the L groups, and each of the L groups includes the M consecutive bits. In other words, the N bits are divided into an L×M virtual matrix, namely, a matrix with L rows and M columns. A value in an $i^{th}$ row and a $i^{th}$ column is corresponding to a value of the $j^{th}$ bit in the $i^{th}$ group. In this case, a correspondence between the N bits and the M time units is as follows: The $i^{th}$ bit in the $i^{th}$ group is corresponding to the $j^{th}$ time unit in the $i^{th}$ frequency domain unit, where $i \in [1, L]$, and $j \in [1, M]$, in other words, values of M consecutive bits in the $i^{th}$ group in the N bits are used to indicate whether M time units of the $i^{th}$ frequency domain unit are used to transmit the data of the terminal device. The virtual matrix is only for ease of understanding, and actually, the N bits are still a sequence of consecutive bits.

In addition, each of the M time units is corresponding to a time length #3 (which is an example of a third time length), that is, time lengths corresponding to any two of the M time units are the same.

Alternatively, the N bits are divided into the M groups, and each of the M groups includes the L consecutive bits.

Similarly, the N bits are divided into an M×L virtual matrix, namely, a matrix with M rows and L columns. A value in the $i^{th}$ row and the $j^{th}$ column is corresponding to a value of the $j^{th}$ bit in the $i^{th}$ group. In this case, a correspondence between the N bits and the M time units is as follows: The $i^{th}$ bit in the $i^{th}$ group is corresponding to the $j^{th}$ frequency domain unit in the $i^{th}$ time unit, where $i \in [1, M]$, and $j \in [1, L]$, in other words, values of L consecutive bits in the $i^{th}$ group in the N bits are used to indicate whether L frequency domain units of the $i^{th}$ time unit are used to transmit the data of the terminal device. The virtual matrix is only for ease of understanding, and actually, the N bits are still a sequence of consecutive bits.

In addition, each of the M time units is corresponding to a time length #4 (which is an example of a fourth time unit), that is, time lengths corresponding to any two of the M time units are the same.

L is a quantity of frequency domain units, and a frequency band width corresponding to one frequency domain unit may be 15 kHz or 30 kHz, or may be any preset frequency band width. This is not limited herein.

For the M time units, the M time units are divided into M×L time-frequency resource grids by using L frequency domain units, or the M time units are divided into M×L time-frequency resource units by using L frequency domain units, where a time length of one time-frequency resource unit in time domain is a time length corresponding to at least one symbol, and a frequency band width of one time-frequency resource unit in frequency domain is a frequency band width corresponding to at least one frequency domain unit.

In this embodiment of the present disclosure, one time-frequency resource unit may be one or more resource elements REs.

In this embodiment of the present disclosure, the value of the $j^{th}$ bit in the $i^{th}$ group is used to indicate whether a corresponding time-frequency resource unit is used to transmit the data for the terminal device. There may be a plurality of specific indication manners.

Manner 1

A time unit used for transmitting the data of the terminal device is directly indicated.

If the value of the $j^{th}$ bit in the $i^{th}$ group is 0, the $j^{th}$ time unit in the $i^{th}$ frequency domain unit is not used to send downlink data for the terminal device; or if the value of the $j^{th}$ bit in the $i^{th}$ group is 1, the $j^{th}$ time unit in the $i^{th}$ frequency domain unit is used to send downlink data for the terminal device. For example, "0" indicates that the $j^{th}$ time unit in the $i^{th}$ frequency domain unit is not a resource used to send the downlink data for the terminal device, or "0" may indicate that the network device does not occupy the $j^{th}$ time unit in the $i^{th}$ frequency domain unit to transmit the data of the terminal device; and "1" indicates that the $i^{th}$ time unit in the $i^{th}$ frequency domain unit is a resource used to send the downlink data for the terminal device, or "1" may indicate that the network device occupies the $i^{th}$ time unit in the $i^{th}$ frequency domain unit to transmit the data of the terminal device.

Alternatively, "1" indicates that the $j^{th}$ time unit in the $i^{th}$ frequency domain unit is not a resource used to send the downlink data for the terminal device, or "1" may indicate that the network device does not occupy the $j^{th}$ time unit in the $i^{th}$ frequency domain unit to transmit the data of the terminal device; and "0" indicates that the $j^{th}$ time unit in the $i^{th}$ frequency domain unit is a resource used to send the downlink data for the terminal device, or "0" may indicate that the network device occupies the $j^{th}$ time unit in the $i^{th}$ frequency domain unit to transmit the data of the terminal device.

If the value of the $j^{th}$ bit in the $i^{th}$ group is "0", the $j^{th}$ frequency domain unit in the $i^{th}$ time unit is not used to send downlink data for the terminal device; or if the value of the $j^{th}$ bit in the $i^{th}$ group is "1", the $j^{th}$ frequency domain unit in the $i^{th}$ time unit is a resource used to send downlink data for the terminal device.

For example, "0" indicates that the $j^{th}$ frequency domain unit in the $i^{th}$ time unit is not a resource used to send the downlink data for the terminal device, or "0" may indicate that the network device does not occupy the $j^{th}$ frequency domain unit in the $i^{th}$ time unit to transmit the data of the terminal device; and "1" indicates that the $j^{th}$ frequency domain unit in the $i^{th}$ time unit is a resource used to send the downlink data for the terminal device, or "1" may indicate that the network device occupies the $i^{th}$ frequency domain unit in the $i^{th}$ time unit to transmit the data of the terminal device.

Alternatively, "1" indicates that the $i^{th}$ frequency domain unit in the $i^{th}$ time unit is not a resource used to send the downlink data for the terminal device, or "1" may indicate that the network device does not occupy the $j^{th}$ frequency domain unit in the $i^{th}$ time unit to transmit the data of the terminal device; and "0" indicates that the $j^{th}$ frequency domain unit in the $i^{th}$ time unit is a resource used to send the downlink data for the terminal device, or "0" may indicate that the network device occupies the $i^{th}$ frequency domain unit in the $i^{th}$ time unit to transmit the data of the terminal device.

In this case, same as Case 1, the terminal device may directly receive, based on values of the N bits, downlink data in a time unit used to transmit the terminal device.

Manner 2

A time unit that is not used to transmit the data of the terminal device is directly indicated, so that the terminal device indirectly determines a time unit used for transmitting the data of the terminal device.

For example, only "0" or "1" is used to indicate that the network device occupies the $j^{th}$ time unit in the $i^{th}$ frequency domain unit to transmit data of another terminal device.

In this case, the terminal device may receive all data on time-frequency resources including L×M time-frequency resource units, and then obtain, based on values of the N bits, data related to the terminal device in a time-frequency resource unit that is used to transmit only the data of the terminal device, or remove, from the received data, data that does not belong to the terminal device.

Figure 10:
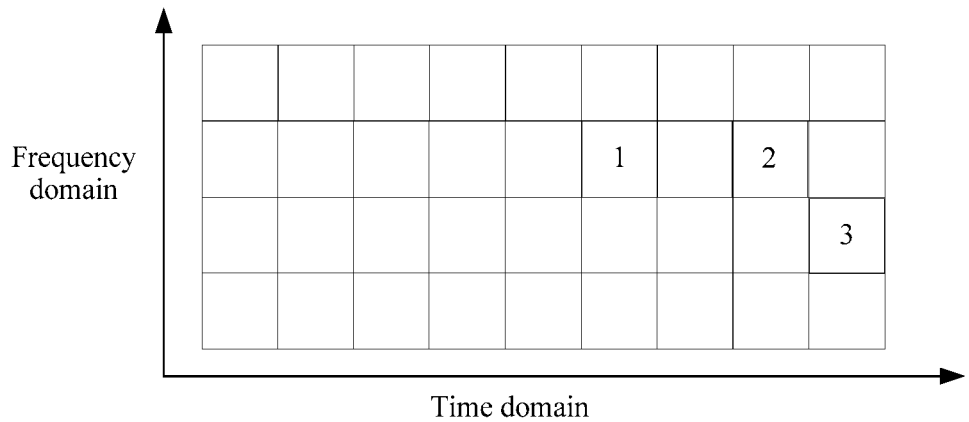
FIG. 10 is a schematic structural diagram of time-frequency resources of a data transmission method according to an embodiment of the present disclosure.

The following describes the embodiment in Case 2 by using FIG. 10 as an example.

FIG. 10 is a schematic structural diagram of time-frequency resources of a data transmission method according to an embodiment of the present disclosure. As shown in FIG. 10, a horizontal axis represents a time domain direction, and includes nine time units, and a vertical axis represents a frequency domain direction, and includes four frequency domain units. The time-frequency resources include 4×9=36 time-frequency resource units. A location 1, a location 2, and a location 3 are time-frequency resource units occupied by another terminal device, and 36 bits are divided into 4×9 matrices, namely, a matrix with four rows and nine columns, and a value in an $i^{th}$ row and in a $j^{th}$ column is corresponding to a value of the $i^{th}$ bit in an $i^{th}$ group.

A virtual matrix corresponding to the N bits in the indication information #1 is as follows:

000000000
000001010
000000001
000000000

"1" represents a $j^{th}$ time unit, in an $i^{th}$ frequency domain unit, occupied by the another terminal device. Herein, the location 1 represents the sixth time unit in the second frequency domain unit, corresponding to the sixth bit in a second group, the location 2 represents an eighth time unit in the second frequency domain unit, corresponding to the eighth bit in the second group, and the location 3 represents a ninth time unit in the third frequency domain unit, corresponding to the ninth bit in a third group.

Actual N bits may be read by row in the foregoing virtual matrix and are specifically 000000000 000001010 000000001 000000000, or read by column and are specifically 0000 0000 0000 0000 0010 0000 0010 0100.

Optionally, the method further includes:

sending, by the network device, sixth indication information to the terminal device, where the sixth indication information is used to indicate at least one of the following values: N, M, or L.

Therefore, according to the data transmission method in this embodiment of the present disclosure, the N bits are divided into an M×L virtual matrix. A time-frequency resource of a same size is divided into N time-frequency resource grids: divided into M time units in time domain, and divided into L frequency domain units in frequency domain. Different M and L are configured for different terminal devices. For example, if N=36, M=4 and L=9 for a user 1, and M=6 and L=6 for a user 2. Therefore, the time-frequency resource of the same size may indicate four granularities in time domain and nine granularities in frequency domain for the user 1. However, for the user 2, the time-frequency resource of the same size may indicate finer granularities in time domain, namely, six granularities, and indicate coarser granularities in frequency domain, namely, six granularities. In this way, a unified signaling format can be used to indicate different time-frequency resource granularities for different users, thereby reducing complexity of a signaling design.

Optionally, the first indication information is carried in a time unit in the M1 time units.

In this way, after receiving the indication information, the terminal device can determine a start location of a time unit corresponding to the first bit in the N bits, and the start location does not need to be indicated by using additional signaling, thereby effectively reducing signaling overheads.

Optionally, the first indication information is carried in a first time unit in the M1 time units.

Therefore, according to the data transmission method in this embodiment of the present disclosure, in one aspect, the network device sends the first indication information to the terminal device, where the N bits included in the first indication information are corresponding to the M time units, the M time units are corresponding to at least one time length, and a value of each bit is used to indicate whether a corresponding time unit is used to transmit the data for the terminal device, that is, a bitmap manner is used to indicate a time unit for transmitting the data of the terminal device. This allows the network device to use a unified time domain resource indication manner in different application scenarios that support time units of different time lengths, thereby improving system flexibility, and reducing complexity of a signaling design.

In another aspect, the N bits are divided into the M×L virtual matrix. The time-frequency resource of the same size is divided into the N time-frequency resource grids: divided into the M time units in time domain, and divided into the L frequency domain units in frequency domain. Different M and L are configured for different terminal devices. In this way, a unified signaling format can be used to indicate different time-frequency resource granularities for different terminal devices, thereby reducing complexity of a signaling design.

In still another aspect, the M time units are divided into the M1 time units and the M2 time units by using the P1 consecutive bits and the Q1 consecutive bits, so that the P1 bits are corresponding to the M1 time units, and the Q1 bits are corresponding to the M2 time units. The first time length corresponding to the M1 time units is different from the second time length corresponding to the M2 time units. In this way, a relatively small quantity of bits can be used to indicate a relatively long time length, thereby effectively reducing bits (or a quantity of bits) in the indication information, or in other words, reducing signaling overheads.

Figure 11:
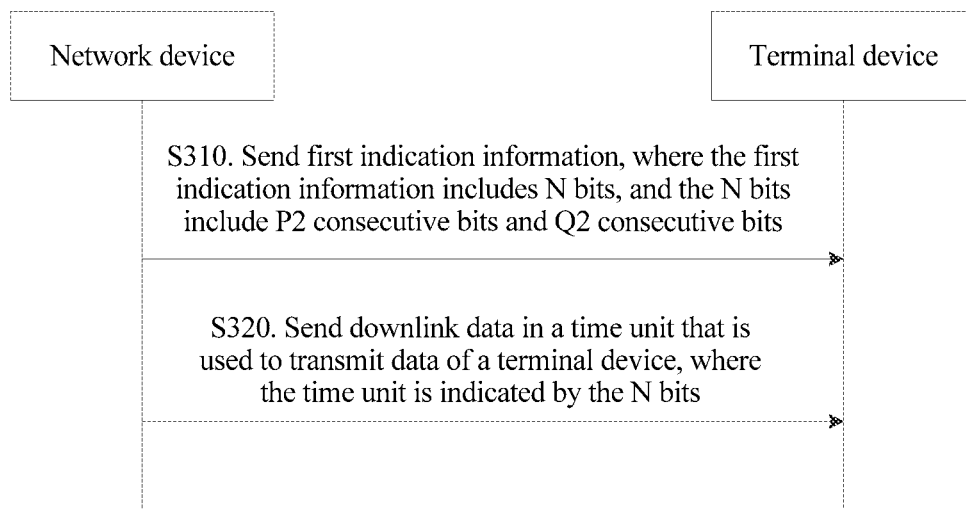
FIG. 11 is a schematic interaction diagram of a data transmission method according to an embodiment of the present disclosure.

An embodiment of the present disclosure further provides a data transmission method. FIG. 11 is a schematic interaction diagram of a data transmission method according to an embodiment of the present disclosure. As shown in FIG. 11, the method includes the following steps.

S310. A network device sends first indication information, where the first indication information includes N bits, the N bits include P2 consecutive bits and Q2 consecutive bits, N=P2+Q2, and N is an integer greater than or equal to 1.

The P2 bits are corresponding to M3 time units, each of the M3 time units is corresponding to a fifth time length, a value of each of the P2 bits is used to indicate whether a corresponding time unit is used to transmit data of a terminal device, a first bit sequence including the Q2 bits is used to indicate a first value S1, the first value is a quantity of time units used for transmitting the data of the terminal device, each of S1 time units is corresponding to a sixth time length, M3 is greater than or equal to P2, and S1 is an integer greater than or equal to 1.

Alternatively, a second bit sequence including the P2 bits is used to indicate a second value S2, the second value is a quantity of time units used for transmitting data of a terminal device, a third bit sequence including the Q2 bits is used to indicate a third value S3, the third value is a quantity of time units used for transmitting the data of the terminal device, each of S2 time units is corresponding to a seventh time length, each of S3 time units is corresponding to an eighth time length, the seventh time length is different from the eighth time length, S2 is an integer greater than or equal to 1, and S3 is an integer greater than or equal to 1.

Specifically, the N bits include two parts of bits: a first part of bits, namely the P2 consecutive bits, and a second part of bits, namely the Q2 consecutive bits, where N=P2+Q2. In other words, the P2 consecutive bits and the Q2 consecutive bits do not overlap, that is, the P2 consecutive bits and the Q2 consecutive bits have no overlapping bits. It can also be understood as that a last bit in the P2 consecutive bits is immediately next to the first bit in the Q2 consecutive bits, or a last bit in the Q2 consecutive bits is immediately next to the first bit in the P2 consecutive bits.

In this embodiment of the present disclosure, the P2 bits in the N bits may be corresponding to the M3 time units, and a bit sequence #1 (which is an example of the first bit sequence) including the Q2 bits is used to indicate a quantity of time units for transmitting the data of the terminal device. Alternatively, both a bit sequence #2 (which is an example of the second bit sequence) including the P2 bits and a bit sequence #3 (which is an example of the third bit sequence) including the Q2 bits are used to indicate a quantity of time units for transmitting the data of the terminal device. The following separately describes in detail the two cases.

Case 3

The P2 bits may be corresponding to the M3 time units, and the bit sequence #1 including the Q2 bits is used to indicate the quantity S1 of time units for transmitting the data of the terminal device.

Specifically, the S1 time units may be located after the M3 time units in time domain, or the S1 time units may be located before the M3 time units in time domain. If the S1 time units are located after the M3 time units in time domain, a first time unit in the S1 time units is immediately next to a last time unit in the M3 time units. If the S1 time units are located before the M3 time units in time domain, a first time unit in the M3 time units is immediately next to a last time unit in the S1 time units.

In addition, the S1 time units may be consecutive or inconsecutive in time domain.

In other words, some time units between two adjacent time units of the S1 time units are not used to transmit the data of the terminal device, but all of the S1 time units are used to transmit the data of the terminal device.

Each of the M3 time units is corresponding to a time length #5 (which is an example of the fifth time length), and each of the S1 time units is corresponding to a time length #6 (which is an example of the sixth time length). The time length #5 may be the same as or different from the time length #6.

It should be noted that in this case, any one of P2 and Q2 may be 0. In other words, time units corresponding to the N bits are corresponding to a same time length. Specially, Q2 may be set to 0. In this way, the N bits indicate only a time unit corresponding to a relatively short time length (namely, the time length #5), thereby reducing signaling overheads more effectively.

In this way, the N bits are divided into the P2 consecutive bits and the Q2 consecutive bits, so that the P2 bits are corresponding to the M3 time units, and the first bit sequence including the Q2 bits is used to indicate the quantity of time units for transmitting the data of the terminal device. Therefore, the network device is allowed to use a unified time domain resource indication manner, thereby improving system flexibility; in addition, a relatively small quantity of bits can be used to indicate a relatively long time length, thereby effectively reducing bits (or a quantity of bits) in the indication information, or in other words, reducing signaling overheads.

Optionally, the fifth time length is different from the sixth time length, and the fifth time length is shorter than the sixth time length.

In this way, the fifth time length is shorter than the sixth time length, so that a relatively small quantity of bits can be used to indicate a relatively long time length, thereby effectively reducing signaling overheads.

The following describes in detail a manner of indicating a time unit for transmitting data in the embodiments of the present disclosure still with reference to specific structures of a time unit in five application scenarios described in FIG. 3 to FIG. 7.

For ease of description, that the time length #1 is corresponding to a length of one symbol, and the time length #2 is corresponding to a length of one slot is used as an example to describe the embodiments of the present disclosure in detail.

In addition, in the following embodiment, it is assumed that P2=M3=7, and Q2=$\log_2$(M4), where 7 is a quantity of OFDM symbols included in one slot, M4 is a maximum quantity of aggregated slots, and the maximum quantity of aggregations is 4. Then, Q2=2, and N=9. In addition, in the following embodiment, "0" indicates that the network device does not occupy the time unit to transmit the data of the terminal device, and "1" indicates that the network device occupies the time unit to transmit the data for the terminal device.

Scenario 1

For a terminal device #1, values of 9 bits are (0 1 1 1 1 1 1 0 1), and seven symbols corresponding to the first 7 bits are the M1 time units, indicating that the last six symbols in a slot #1 are used to transmit data of the terminal device #1. The bit sequence #1 including the last 2 bits indicates a quantity of time units for transmitting the data of the terminal device #1, namely, 1, and the time unit is a slot #2 after the slot #1.

Similarly, for a terminal device #2 (which is another example of the terminal device), values of 10 bits are (0 1 1 1 1 1 1 0 0), and seven symbols corresponding to the first 7 bits are the M1 time units, indicating that the last six symbols in a slot #3 are used to transmit data of the terminal device #2. The bit sequence #1 including the last 2 bits indicates a quantity of time units for transmitting the data of the terminal device, namely, 0.

Scenario 2

For a terminal device #1, values of 10 bits are (0 1 1 0 0 0 0 0 0), seven symbols corresponding to the first 7 bits are the M1 time units, indicating that a second symbol and a third symbol in a slot #1 are used to transmit data of the terminal device #1. The bit sequence #1 including the last 2 bits indicates a quantity of time units for transmitting the data of the terminal device, namely, 0.

Similarly, for a terminal device #2, values of 10 bits are (0 0 0 1 1 1 1 0 0), seven symbols corresponding to the first 7 bits are the M1 time units, indicating that the last four symbols in a slot #1 are used to transmit data of the terminal device #2. The bit sequence #1 including the last 2 bits indicates a quantity of time units for transmitting the data of the terminal device, namely, 0.

Scenario 3

As indicated in the first diagram in FIG. 5, a control channel and a corresponding data channel are sent by using a same beam, and a resource that is not used by the control channel may be used to send data.

For a terminal device #1, values of 10 bits are (1 1 0 0 0 0 0 0 0), seven symbols corresponding to the first 7 bits are the M1 time units, indicating that a first symbol and a second symbol in a slot #1 are used to transmit data of the terminal device #1. The bit sequence #1 including the last 2 bits indicates a quantity of time units for transmitting the data of the terminal device, namely, 0.

For a terminal device #2, values of 10 bits are (0 0 1 1 0 0 0 0 0), seven symbols corresponding to the first 7 bits are the M1 time units, indicating that a third symbol and a fourth symbol in a slot #1 are used to transmit data of the terminal device #2. The bit sequence #1 including the last 2 bits indicates a quantity of time units for transmitting the data of the terminal device, namely, 0.

In the second diagram in FIG. 5, the network device first sends a control channel, and then sends a data channel, and a resource that is not used by the control channel may be used to send data. In this scenario, symbols that are included in one mini-slot and that are used to transmit data are inconsecutive.

For a terminal device #1, values of 10 bits are (1 0 0 1 0 0 0 0 0), seven symbols corresponding to the first 7 bits are the M1 time units, indicating that a first symbol and a fourth symbol in a slot #1 are used to transmit data of the terminal device #1. The bit sequence #1 including the last 2 bits indicates a quantity of time units for transmitting the data of the terminal device, namely, 0.

For a terminal device #2, values of 10 bits are (0 1 0 0 1 0 0 0 0), seven symbols corresponding to the first 7 bits are the M1 time units, indicating that a second symbol and a fifth symbol in a slot #1 are used to transmit data of the terminal device #2. The bit sequence #1 including the last 2 bits indicates a quantity of time units for transmitting the data of the terminal device, namely, 0.

Scenario 4

For a terminal device #1, values of 10 bits are (0 1 1 1 0 1 0 0 0), seven symbols corresponding to the first 7 bits are the M1 time units, indicating that a second symbol, a third symbol, a fourth symbol, and a sixth symbol in a slot #1 are used to transmit data of the terminal device #1. The bit sequence #1 including the last 2 bits indicates a quantity of time units for transmitting the data of the terminal device, namely, 0.

Scenario 5

For a terminal device #1, values of 10 bits are (0 0 0 0 0 1 1 1 0), seven symbols corresponding to the first 7 bits are the M1 time units, indicating that the sixth symbol, and the seventh symbol in a slot #1 are used to transmit data of the terminal device #1. The bit sequence #1 including the last 2 bits indicates a quantity of time units for transmitting the data of the terminal device, namely, 2, and the time units are a slot #2 and a slot #3 after the slot #1.

Case 4

Both the bit sequence #2 including the P2 bits and the bit sequence #3 including the Q2 bits are used to indicate a quantity of time units for transmitting the data of the terminal device.

To be specific, the bit sequence #2 including the P2 bits is used to indicate that the S2 time units are used to transmit the data of the terminal device. The bit sequence #3 including the Q2 bits is used to indicate that the S3 time units are used to transmit the data of the terminal device. Each of the S2 time units is corresponding to a time length #7 (which is an example of the seventh time length), and each of the S3 time units is corresponding to a time length #8 (which is an example of the eighth time length). The time length #7 is different from the time length #8.

Specifically, the S2 time units may be located after the S3 time units in time domain, or the S2 time units may be located before the S3 time units in time domain. If the S2 time units are located after the S3 time units in time domain, a first time unit in the S2 time units is immediately next to a last time unit in the S3 time units. If the S2 time units are located before the S3 time units in time domain, a first time unit in the S3 time units is immediately next to a last time unit in the S2 time units.

In addition, the S2 time units may be consecutive or inconsecutive in time domain. In other words, some time units between two adjacent time units of the S2 time units are not used to transmit the data of the terminal device, but all of the S3 time units are used to transmit the data of the terminal device.

Similarly, the S3 time units may be consecutive or inconsecutive in time domain. In other words, some time units between two adjacent time units of the S3 time units are not used to transmit the data of the terminal device, but all of the S1 time units are used to transmit the data of the terminal device.

In addition, it should be noted that in this case, any one of P2 and Q2 may be 0. In other words, time units corresponding to the N bits are corresponding to a same time length. Specially, P2 may be set to 0. In this way, the N bits indicate only a time unit corresponding to a relatively short time length (namely, the time length #6), thereby reducing signaling overheads more effectively.

For brevity, only Scenario 1 and Scenario 5 are described below. Indication manners in other scenarios are similar to those in Scenario 1 and Scenario 5. Details are not described herein again. In addition, a length of a time unit corresponding to the bit sequence #2 (namely, the seventh time length) is a length of one symbol, and a length of a time unit corresponding to the bit sequence #3 (namely, the eighth time length) is a length of one slot.

Scenario 1

For example, for a terminal device #1, a slot #1 has seven symbols in total and needs to be indicated by $P2=\log_2(7)=3$ bits, and a slot #2 is also used by the terminal device to transmit the data. It is assumed that there are a maximum of four slots for aggregation. Then, $Q2=P2=\log_2(4)=2$, and N=3+2=5 bits, where values of the N bits are (110 01). The bit sequence #2 including the first 3 bits indicates a quantity of time units for transmitting the data of the terminal device, namely, 6, and the time units are the last six symbols in the slot #1. The bit sequence #3 including the last 2 bits indicates a quantity of time units for transmitting the data of the terminal device, namely, 1, and the time unit is the slot #2 after the slot #1.

Scenario 5

For example, for a terminal device #1, a slot #1 has seven symbols in total and needs to be indicated by $P2=\log_2(7)=3$ bits, and a slot #2 is also used by the terminal device to transmit the data. It is assumed that there are a maximum of four slots for aggregation. Then, $Q2=P2=\log_2(4)=2$, and N=3+2=5 bits, where values of the N bits are (010 10). The bit sequence #2 including the first 3 bits indicates a quantity of time units for transmitting the data of the terminal device, namely, 2, and the time units are the last two symbols in the slot #1. The bit sequence #3 including the last 2 bits indicates a quantity of time units for transmitting the data of the terminal device, namely, 2, and the time units are the slot #2 and a slot #3 after the slot #1.

In this way, the N bits are divided into the P2 consecutive bits and the Q2 consecutive bits, so that the second bit sequence including the P2 bits is used to indicate the quantity S2 of time units for transmitting the data of the terminal device, the third bit sequence including the Q2 bits is used to indicate the quantity S3 of time units for transmitting the data of the terminal device, and the time length #7 is different from the time length #8. Therefore, the network device is allowed to use a unified time domain resource indication manner, thereby improving system flexibility. In addition, complexity of a signaling design is reduced. A relatively small quantity of bits can be used to indicate a relatively long time length, thereby effectively reducing bits (or a quantity of bits) in the indication information, or in other words, reducing signaling overheads.

Optionally, the method further includes:

sending, by the network device, third indication information, where the third indication information is used to indicate at least one of the following values: N, P2, or Q2.

In other words, the network device may indicate N, P2, or Q2 by using indication information #3 (which is an example of the third indication information). In this way, the terminal device can determine at least one of N, P2, or Q2 based on the indication information #3.

The indication information #3 may be dynamic signaling, semi-static signaling, or static signaling. This is not specially limited in this embodiment of the present disclosure.

It should be noted that when the indication information #3 indicates only one of the values, one of the other two values may be specified in a protocol, and the remaining value may be determined based on a relationship between the two values and a relationship between the three values. When the indication information #3 indicates two of the values, the remaining value may also be determined based on a relationship between the two values and a relationship between the three values.

When all the three values are specified in the protocol, the network device does not need to indicate N, P2, or Q2 by using signaling.

Further, in S310, the terminal device receives the indication information #1, and determines a time unit used to transmit the data of the terminal device.

In S320, the network device sends downlink data in a time unit that is used to transmit the data of the terminal device, where the time unit is indicated by the N bits.

Further, the terminal device receives the downlink data based on the time unit determined in S310.

The data transmission method according to embodiments of the present disclosure is described above in detail with reference to FIG. 1 and FIG. 11, and a data transmission apparatus according to the embodiments of the present disclosure is described below with reference to FIG. 12 and FIG. 19. Technical features described in the method embodiment are also applicable to the following apparatus embodiments.

Figure 12:
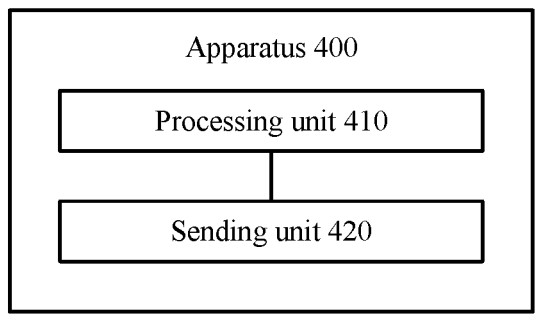
FIG. 12 is a schematic block diagram of a data transmission apparatus according to an embodiment of the present disclosure.

FIG. 12 is a schematic block diagram of a data transmission apparatus 400 according to an embodiment of the present disclosure. As shown in FIG. 12, the apparatus 400 includes:

a processing unit 410, configured to generate first indication information; and a sending unit 420, configured to send the first indication information, where the first indication information includes N bits, the N bits are corresponding to M time units, the M time units are corresponding to at least one time length, a value of each bit is used to indicate whether a corresponding time unit is used to transmit data of a terminal device, M is an integer greater than or equal to 1, and N is an integer greater than or equal to 1, where the sending unit 420 is further configured to send downlink data in a time unit that is used to transmit the data of the terminal device, where the time unit is indicated by the N bits.

Therefore, according to the data transmission apparatus in this embodiment of the present disclosure, the apparatus sends the first indication information to the terminal device, where the N bits included in the first indication information are corresponding to the M time units, the M time units are corresponding to at least one time length, and a value of each bit is used to indicate whether a corresponding time unit is used to transmit the data for the terminal device, that is, a bitmap manner is used to indicate a time unit for transmitting the data of the terminal device. This allows the apparatus to use a unified time domain resource indication manner in application scenarios that support time units of different time lengths, thereby improving system flexibility, and reducing complexity of a signaling design.

Optionally, the N bits include P1 consecutive bits and Q1 consecutive bits, N=P1+Q1, and M is greater than or equal to N.

M=M1+M2, the P1 consecutive bits are corresponding to M1 time units, the Q1 consecutive bits are corresponding to M2 time units, each of the M1 time units is corresponding to a first time length, each of the M2 time units is corresponding to a second time length, and the first time length is different from the second time length.

Therefore, the data transmission apparatus in this embodiment of the present disclosure divides the N bits included in the first indication information into the P1 consecutive bits and the Q1 consecutive bits, and divides the M time units into the M1 time units and the M2 time units, so that the P1 bits are corresponding to the M1 time units, and the Q1 bits are corresponding to the M2 time units. The first time length corresponding to the M1 time units is different from the second time length corresponding to the M2 time units. In this way, a relatively small quantity of bits can be used to indicate a relatively long time length, thereby effectively reducing bits (or a quantity of bits) in the first indication information, or in other words, reducing signaling overheads.

Optionally, a last time unit in the M1 time units is located before a first time unit in the M2 time units in time domain, and the first time length is shorter than the second time length.

Optionally, the M1 time units belong to one slot.

Optionally, the first time length is a time length corresponding to one symbol, and the second time length is a time length corresponding to one slot.

Optionally, the N bits are divided into L groups, each of the L groups includes M consecutive bits, L is a quantity of frequency domain units, the $i^{th}$ bit in an $i^{th}$ group is corresponding to a $j^{th}$ time unit in an $i^{th}$ frequency domain unit, the $i^{th}$ group belongs to the L groups, the $i^{th}$ frequency domain unit belongs to L frequency domain units, $i \in [1, L]$, $j \in [1, M]$, each of the M time units is corresponding to a third time length, M is less than or equal to N, and L is an integer greater than or equal to 1.

Optionally, if a value of the $j^{th}$ bit in the $i^{th}$ group is 0, the $j^{th}$ time unit in the $i^{th}$ frequency domain unit is used to send downlink data for the terminal device; or if a value of the $j^{th}$ bit in the $i^{th}$ group is 1, the $j^{th}$ time unit in the $i^{th}$ frequency domain unit is not used to send downlink data for the terminal device.

Optionally, the N bits are divided into M groups, each of the M groups includes L consecutive bits, L is a quantity of frequency domain units, the $j^{th}$ bit in an $i^{th}$ group is corresponding to a $i^{th}$ frequency domain unit in an $i^{th}$ time unit, the $i^{th}$ group belongs to the M groups, the $i^{th}$ time unit belongs to the M time units, $i \in [1, M]$, $j \in [1, L]$, each of the M time units is corresponding to a fourth time length, M is less than or equal to N, and L is an integer greater than or equal to 1.

Optionally, if a value of the $j^{th}$ bit in the $i^{th}$ group is 0, the $j^{th}$ frequency domain unit in the $i^{th}$ time unit is used to send downlink data for the terminal device; or if a value of the $j^{th}$ bit in the $i^{th}$ group is 1, the $j^{th}$ frequency domain unit in the $i^{th}$ time unit is not used to send downlink data for the terminal device.

Optionally, the sending unit 420 is further configured to:

send sixth indication information, where the sixth indication information is used to indicate at least one of the following values: N, M, or L.

Optionally, the sending unit 420 is further configured to:
send second indication information, where the second indication information is used to indicate at least one of the following values: N, P1, or Q1.

The data transmission apparatus 400 may be corresponding to the network device described in the method 200 (for example, may be configured as the network device or may be the network device), and modules or units in the data transmission apparatus 400 are configured to perform respective actions or processing processes performed by the network device in the method 200. To avoid repetition, details are not described herein again.

In this embodiment of the present disclosure, the apparatus 400 may include a processor and a transceiver. The processor is communicatively connected to the transceiver. Optionally, the apparatus further includes a memory, where the memory is communicatively connected to the processor. Optionally, the processor, the memory, and the transceiver may be communicatively connected to each other, the memory may be configured to store an instruction, and the processor is configured to execute the instruction stored in the memory, to control the transceiver to send information or a signal.

The processing unit 410 of the apparatus 400 shown in FIG. 12 may be corresponding to the processor, and the sending unit 420 may be corresponding to the transceiver.

It should be noted that, the foregoing method embodiments in the embodiments of the present disclosure may be applied to a processor, or implemented by a processor. The processor may be an integrated circuit chip and has a signal processing capability. In an implementation process, steps in the foregoing method embodiments can be implemented by using a hardware integrated logical circuit in the processor, or by using instructions in a form of software. The processor may be a general-purpose processor, a digital signal processor (DSP), an application-specific integrated circuit (ASIC), a field programmable gate array (FPGA) or another programmable logic device, a discrete gate or transistor logic device, or a discrete hardware component. It may implement or perform the methods, steps, and logical block diagrams that are disclosed in the embodiments of the present disclosure. The general-purpose processor may be a microprocessor, or the processor may be any conventional processor or the like. Steps of the methods disclosed with reference to the embodiments of the present disclosure may be directly performed and accomplished through a hardware decoding processor, or may be performed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

It may be understood that the memory in this embodiment of the present disclosure may be a volatile memory or a non-volatile memory, or may include a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus dynamic random access memory (DR RAM). It should be noted that the memory of the systems and methods described in this specification includes but is not limited to these and any memory of another proper type.

Figure 13:
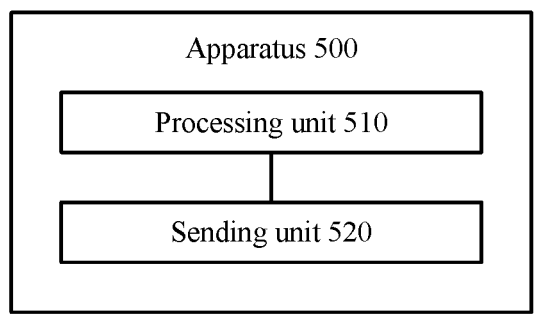
FIG. 13 is a schematic block diagram of a data transmission apparatus according to an embodiment of the present disclosure.

FIG. 13 is a schematic block diagram of a data transmission apparatus 500 according to an embodiment of the present disclosure. As shown in FIG. 13, the apparatus 500 includes:

a processing unit 510, configured to generate first indication information; and a sending unit 520, configured to send the first indication information, where the first indication information includes N bits, the N bits include P2 consecutive bits and Q2 consecutive bits, N=P2+Q2, and N is an integer greater than or equal to 1, where the P2 bits are corresponding to M3 time units, each of the M3 time units is corresponding to a fifth time length, a value of each of the P2 bits is used to indicate whether a corresponding time unit is used to transmit data of a terminal device, a first bit sequence including the Q2 bits is used to indicate a first value S1, the first value is a quantity of time units used for transmitting the data of the terminal device, each of S1 time units is corresponding to a sixth time length, M3 is greater than or equal to P2, and S1 is an integer greater than or equal to 1; or a second bit sequence including the P2 bits is used to indicate a second value S2, the second value is a quantity of time units used for transmitting data of a terminal device, a third bit sequence including the Q2 bits is used to indicate a third value S3, the third value is a quantity of time units used for transmitting the data of the terminal device, each of S2 time units is corresponding to a seventh time length, each of S3 time units is corresponding to an eighth time length, the seventh time length is different from the eighth time length, S2 is an integer greater than or equal to 1, and S3 is an integer greater than or equal to 1; and the sending unit 520 is further configured to send downlink data in a time unit that is used to transmit the data of the terminal device, where the time unit is indicated by the N bits.

Therefore, according to the data transmission apparatus in this embodiment of the present disclosure, in one aspect, the N bits are divided into the P2 consecutive bits and the Q2 consecutive bits, so that the P2 bits are corresponding to the M3 time units, and the first bit sequence including the Q2 bits is used to indicate the quantity of time units for transmitting the data of the terminal device. Alternatively, the N bits are divided into the P2 consecutive bits and the Q2 consecutive bits, so that the second bit sequence including the P2 bits is used to indicate the quantity S2 of time units for transmitting the data of the terminal device, the first bit sequence including the Q2 bits is used to indicate the quantity S3 of time units for transmitting the data of the terminal device, and the seventh time length is different from the eighth time length. This allows the apparatus to use a unified time domain resource indication manner in application scenarios that support time units of different time lengths, thereby improving system flexibility, and reducing complexity of a signaling design.

In another aspect, a relatively small quantity of bits can be used to indicate a relatively long time length, thereby effectively reducing bits (or a quantity of bits) in the indication information, or in other words, reducing signaling overheads.

Optionally, the fifth time length is shorter than the sixth time length.

In this way, the fifth time length is shorter than the sixth time length, so that a relatively small quantity of bits can be used to indicate a relatively long time length, thereby effectively reducing signaling overheads.

Optionally, the sending unit 520 is further configured to send third indication information, where the third indication information is used to indicate at least one of the following values: N, P2, or Q2.

Figure 14:
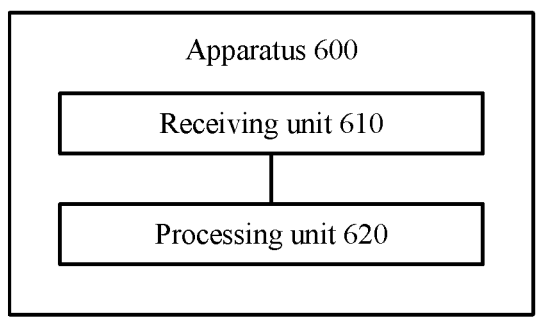
FIG. 14 is a schematic block diagram of a data transmission apparatus according to an embodiment of the present disclosure.

FIG. 14 is a schematic block diagram of a data transmission apparatus 600 according to an embodiment of the present disclosure. As shown in FIG. 14, the apparatus 600 includes:

a receiving unit 610, configured to receive first indication information sent by a network device, where the first indication information includes N bits, N is an integer greater than or equal to 1, the N bits are corresponding to M time units, the M time units are corresponding to at least one time length, a value of each bit is used to indicate whether a corresponding time unit is used to transmit data of the apparatus, and M is an integer greater than or equal to 1; and a processing unit 620, configured to determine, based on the first indication information received by the receiving unit 610, a time unit used to transmit the data of the apparatus, where the receiving unit 610 is configured to receive downlink data in the time unit that is determined by the processing unit 620 and that is used to transmit the data of the apparatus.

Optionally, the N bits include P1 consecutive bits and Q1 consecutive bits, N=P1+Q1, and M is greater than or equal to N.

M=M1+M2, the P1 consecutive bits are corresponding to M1 time units, the Q1 consecutive bits are corresponding to M2 time units, each of the M1 time units is corresponding to a first time length, each of the M2 time units is corresponding to a second time length, and the first time length is different from the second time length.

Optionally, a last time unit in the M1 time units is located before a first time unit in the M2 time units in time domain, and the first time length is shorter than the second time length.

Optionally, the M1 time units belong to one slot.

Optionally, the first time length is a time length corresponding to one symbol, and the second time length is a time length corresponding to one slot.

Optionally, the N bits are divided into L groups, each of the L groups includes M consecutive bits, L is a quantity of frequency domain units, the $j^{th}$ bit in an $i^{th}$ group is corresponding to a $j^{th}$ time unit in an $i^{th}$ frequency domain unit, the $i^{th}$ group belongs to the L groups, the $i^{th}$ frequency domain unit belongs to L frequency domain units, i∈[1, L], j∈[1, M], each of the M time units is corresponding to a third time length, M is less than or equal to N, and L is an integer greater than or equal to 1.

Optionally, if a value of the $j^{th}$ bit in the $i^{th}$ group is 0, the $j^{th}$ time unit in the $i^{th}$ frequency domain unit is used to send downlink data for the terminal device; or if a value of the $j^{th}$ bit in the $i^{th}$ group is 1, the $j^{th}$ time unit in the $i^{th}$ frequency domain unit is not used to send downlink data for the terminal device.

Optionally, the N bits are divided into M groups, each of the M groups includes L consecutive bits, L is a quantity of frequency domain units, the $j^{th}$ bit in an $i^{th}$ group is corresponding to a $i^{th}$ frequency domain unit in an $i^{th}$ time unit, the $i^{th}$ group belongs to the M groups, the $i^{th}$ time unit belongs to the M time units, i∈[1, M], j∈[1, L], each of the M time units is corresponding to a fourth time length, M is less than or equal to N, and L is an integer greater than or equal to 1.

Optionally, if a value of the $j^{th}$ bit in the $i^{th}$ group is 0, the $j^{th}$ frequency domain unit in the $i^{th}$ time unit is used to send downlink data for the terminal device; or if a value of the $j^{th}$ bit in the $i^{th}$ group is 1, the $j^{th}$ frequency domain unit in the $i^{th}$ time unit is not used to send downlink data for the terminal device.

Optionally, the receiving unit 610 is further configured to:

receive sixth indication information, where the sixth indication information is used to indicate at least one of the following values: N, M, or L.

Optionally, the receiving unit 610 is further configured to:

receive second indication information sent by the network device, where the second indication information is used to indicate at least one of the following values: N, P1, or Q1.

Figure 15:
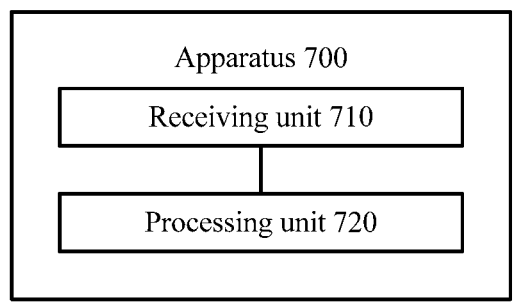
FIG. 15 is a schematic block diagram of a data transmission apparatus according to an embodiment of the present disclosure.

FIG. 15 is a schematic block diagram of a data transmission apparatus 700 according to an embodiment of the present disclosure. As shown in FIG. 15, the apparatus 700 includes:

a receiving unit 710, configured to receive first indication information sent by a network device, where the first indication information includes N bits, N≥1, the N bits include P2 consecutive bits and Q2 consecutive bits, and N=P2+Q2, where the P2 bits are corresponding to M3 time units, each of the M3 time units is corresponding to a fifth time length, a value of each of the P2 bits is used to indicate whether a corresponding time unit is used to transmit data of the apparatus, a first bit sequence including the Q2 bits is used to indicate a first value S1, the first value is a quantity of time units used for transmitting the data of the apparatus, each of S1 time units is corresponding to a sixth time length, M3 is greater than or equal to P2, and S1 is an integer greater than or equal to 1; or a second bit sequence including the P2 bits is used to indicate a second value S2, the second value is a quantity of time units used for transmitting data of the apparatus, a third bit sequence including the Q2 bits is used to indicate a third value S3, the third value is a quantity of time units used for transmitting the data of the apparatus, each of S2 time units is corresponding to a seventh time length, each of S3 time units is corresponding to an eighth time length, the seventh time length is different from the eighth time length, S2 is an integer greater than or equal to 1, and S3 is an integer greater than or equal to 1; and a processing unit 720, configured to determine, based on the first indication information received by the receiving unit 710, a time unit used to transmit the data of the apparatus, where the receiving unit 710 is further configured to receive downlink data based on the time unit that is determined by the processing unit 720 and that is used to transmit the data of the terminal device.

Optionally, the fifth time length is shorter than the sixth time length.

Optionally, the receiving unit 710 is further configured to:

receive third indication information sent by the network device, where the third indication information is used to indicate at least one of the following values: N, P2, or Q2.

The data transmission apparatus 700 may be corresponding to the terminal device described in the method 300 (for example, may be configured as the terminal device or may be the terminal device), and modules or units in the data transmission apparatus 700 are configured to perform respective actions or processing processes performed by the terminal device in the method 300. To avoid repetition, details are not described herein again.

In this embodiment of the present disclosure, the apparatus 700 may include a processor and a transceiver. The processor is communicatively connected to the transceiver. Optionally, the apparatus further includes a memory, where the memory is communicatively connected to the processor. Optionally, the processor, the memory, and the transceiver may be communicatively connected to each other, the memory may be configured to store an instruction, and the processor is configured to execute the instruction stored in the memory, to control the transceiver to send information or a signal.

Figure 16:
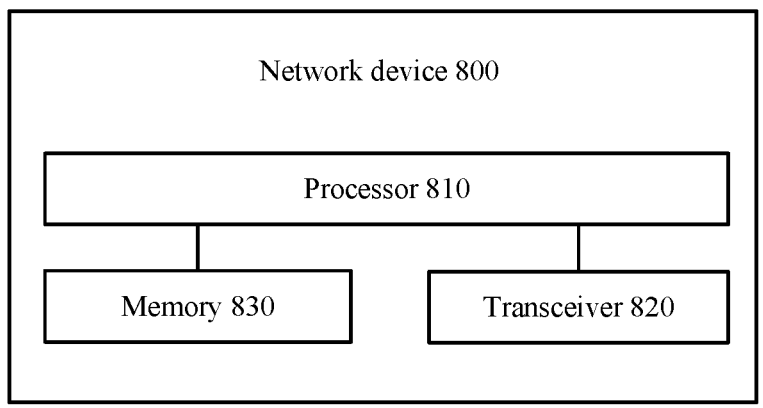
FIG. 16 is a schematic structural diagram of a network device according to an embodiment of the present disclosure.

FIG. 16 shows a network device 800 for data transmission according to an embodiment of the present disclosure. The network device 800 includes:

a processor 810, a transceiver 820, and a memory 830. The processor 810, the transceiver 820, and the memory 830 communicate with each other by using an internal connection path.

The memory 830 is configured to store a program. Specifically, the program may include program code, and the program code includes a computer operation instruction. The memory 830 may include a read-only memory and a random access memory, and provide an instruction and data to the processor 810. The memory 830 may include a high-speed RAM memory, or may include a non-volatile memory, for example, at least one disk memory.

The processor 810 executes the program stored in the memory 830, to control the transceiver 820 to receive a signal or send a signal. The memory 830 may be integrated into the processor 810, or may be independent of the processor 810.

Specifically, the processor 810 is configured to generate first indication information.

The transceiver 820 is configured to send the first indication information, where the first indication information includes N bits, the N bits are corresponding to M time units, the M time units are corresponding to at least one time length, a value of each bit is used to indicate whether a corresponding time unit is used to transmit data of a terminal device, M is an integer greater than or equal to 1, and N is an integer greater than or equal to 1.

The transceiver 820 is further configured to send downlink data in a time unit that is used to transmit the data of the terminal device, where the time unit is indicated by the N bits.

Optionally, the N bits include P1 consecutive bits and Q1 consecutive bits, N=P1+Q1, and M is greater than or equal to N.

M=M1+M2, the P1 consecutive bits are corresponding to M1 time units, the Q1 consecutive bits are corresponding to M2 time units, each of the M1 time units is corresponding to a first time length, each of the M2 time units is corresponding to a second time length, and the first time length is different from the second time length.

Optionally, a last time unit in the M1 time units is located before a first time unit in the M2 time units in time domain, and the first time length is shorter than the second time length.

Optionally, the M1 time units belong to one slot.

Optionally, the first time length is a time length corresponding to one symbol, and the second time length is a time length corresponding to one slot.

Optionally, the N bits are divided into L groups, each of the L groups includes M consecutive bits, L is a quantity of frequency domain units, the $j^{th}$ bit in an $i^{th}$ group is corresponding to a $j^{th}$ time unit in an $i^{th}$ frequency domain unit, the $i^{th}$ group belongs to the L groups, the $i^{th}$ frequency domain unit belongs to L frequency domain units, i∈[1, L], j∈[1, M], each of the M time units is corresponding to a third time length, M is less than or equal to N, and L is an integer greater than or equal to 1.

Optionally, if a value of the $j^{th}$ bit in the $i^{th}$ group is 0, the $j^{th}$ time unit in the $i^{th}$ frequency domain unit is used to send downlink data for the terminal device; or if a value of the $j^{th}$ bit in the $i^{th}$ group is 1, the $j^{th}$ time unit in the $i^{th}$ frequency domain unit is not used to send downlink data for the terminal device.

Optionally, the N bits are divided into M groups, each of the M groups includes L consecutive bits, L is a quantity of frequency domain units, the $j^{th}$ bit in an $i^{th}$ group is corresponding to a $i^{th}$ frequency domain unit in an $i^{th}$ time unit, the $i^{th}$ group belongs to the M groups, the $i^{th}$ time unit belongs to the M time units, i∈[1, M], j∈[1, L], each of the M time units is corresponding to a fourth time length, M is less than or equal to N, and L is an integer greater than or equal to 1.

Optionally, if a value of the $j^{th}$ bit in the $i^{th}$ group is 0, the $j^{th}$ frequency domain unit in the $i^{th}$ time unit is used to send downlink data for the terminal device; or if a value of the $j^{th}$ bit in the $i^{th}$ group is 1, the $j^{th}$ frequency domain unit in the $i^{th}$ time unit is not used to send downlink data for the terminal device.

Optionally, the transceiver 820 is further configured to:

send sixth indication information, where the sixth indication information is used to indicate at least one of the following values: N, M, or L.

Optionally, the transceiver 820 is further configured to:

send second indication information, where the second indication information is used to indicate at least one of the following values: N, P1, or Q1.

This embodiment of the present disclosure may be applied to a processor, or implemented by a processor. The processor may be an integrated circuit chip and has a signal processing capability. In an implementation process, steps in the foregoing methods can be implemented by using a hardware integrated logical circuit in the processor 810, or by using instructions in a form of software. The processor 510 may be a general-purpose processor, including a central processing unit (CPU), a network processor (NP), and the like; or may be a digital signal processor (DSP), an application-specific integrated circuit (ASIC), a field programmable gate array (FPGA) or another programmable logic device, a discrete gate or transistor logic device, or a discrete hardware component. It may implement or perform the methods, steps, and logical block diagrams that are disclosed in the embodiments of the present disclosure. The general-purpose processor may be a microprocessor, or the processor may be any conventional processor or the like. Steps of the methods disclosed with reference to the embodiments of the present disclosure may be directly performed and accomplished through a hardware decoding processor, or may be performed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory 830, and the processor 810 reads information in the memory 830 and completes the steps in the foregoing methods in combination with hardware of the processor 810. To avoid repetition, details are not described herein again.

It may be understood that the memory in this embodiment of the present disclosure may be a volatile memory or a non-volatile memory, or may include a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus dynamic random access memory (DR RAM). It should be noted that the memory of the systems and methods described in this specification includes but is not limited to these and any memory of another proper type.

The network device 800 according to this embodiment of the present disclosure may be corresponding to the network device in the method 200 of the embodiment of the present disclosure, or may be corresponding to the apparatus 400 in the embodiment of the present disclosure. In addition, units or modules in the network device 800, and the foregoing other operations and/or functions are intended to implement corresponding procedures performed by the network device in the method 200. For brevity, details are not described herein again.

Figure 17:
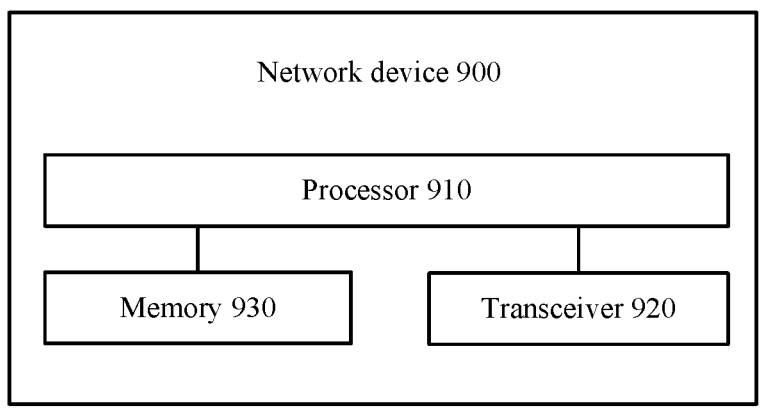
FIG. 17 is a schematic structural diagram of a network device according to an embodiment of the present disclosure.

FIG. 17 shows a network device 900 for data transmission according to an embodiment of the present disclosure. The network device 900 includes:

a processor 910, a transceiver 920, and a memory 930. The processor 910, the transceiver 920, and the memory 930 communicate with each other by using an internal connection path.

The memory 930 is configured to store a program. Specifically, the program may include program code, and the program code includes a computer operation instruction. The memory 930 may include a read-only memory and a random access memory, and provide an instruction and data to the processor 910. The memory 930 may include a high-speed RAM memory, or may include a non-volatile memory, for example, at least one disk memory.

The processor 910 executes the program stored in the memory 930, to control the transceiver 920 to receive a signal or send a signal. The memory 930 may be integrated into the processor 910, or may be independent of the processor 910.

Specifically, the processor 910 is configured to generate first indication information.

The transceiver 920 is configured to send the first indication information, where the first indication information includes N bits, the N bits include P2 consecutive bits and Q2 consecutive bits, N=P2+Q2, and N is an integer greater than or equal to 1.

The P2 bits are corresponding to M3 time units, each of the M3 time units is corresponding to a fifth time length, a value of each of the P2 bits is used to indicate whether a corresponding time unit is used to transmit data of a terminal device, a first bit sequence including the Q2 bits is used to indicate a first value S1, the first value is a quantity of time units used for transmitting the data of the terminal device, each of S1 time units is corresponding to a sixth time length, M3 is greater than or equal to P2, and S1 is an integer greater than or equal to 1.

Alternatively, a second bit sequence including the P2 bits is used to indicate a second value S2, the second value is a quantity of time units used for transmitting data of a terminal device, a third bit sequence including the Q2 bits is used to indicate a third value S3, the third value is a quantity of time units used for transmitting the data of the terminal device, each of S2 time units is corresponding to a seventh time length, each of S3 time units is corresponding to an eighth time length, the seventh time length is different from the eighth time length, S2 is an integer greater than or equal to 1, and S3 is an integer greater than or equal to 1.

The transceiver 920 is further configured to send downlink data in a time unit that is used to transmit the data of the terminal device, where the time unit is indicated by the N bits.

Optionally, the fifth time length is shorter than the sixth time length.

Optionally, the transceiver 920 is further configured to send third indication information, where the third indication information is used to indicate at least one of the following values: N, P2, or Q2.

This embodiment of the present disclosure may be applied to a processor, or implemented by a processor. The processor may be an integrated circuit chip and has a signal processing capability. In an implementation process, steps in the foregoing methods can be implemented by using a hardware integrated logical circuit in the processor 910, or by using instructions in a form of software. The processor 910 may be a general-purpose processor, including a central processing unit (CPU), a network processor (NP), and the like; or may be a digital signal processor (DSP), an application-specific integrated circuit (ASIC), a field programmable gate array (FPGA) or another programmable logic device, a discrete gate or transistor logic device, or a discrete hardware component. It may implement or perform the methods, steps, and logical block diagrams that are disclosed in the embodiments of the present disclosure. The general-purpose processor may be a microprocessor, or the processor may be any conventional processor or the like. Steps of the methods disclosed with reference to the embodiments of the present disclosure may be directly performed and accomplished through a hardware decoding processor, or may be performed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory 930, and the processor 910 reads information in the memory 930 and completes the steps in the foregoing methods in combination with hardware of the processor 910. To avoid repetition, details are not described herein again.

It may be understood that the memory in this embodiment of the present disclosure may be a volatile memory or a non-volatile memory, or may include a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM)

used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (Double Data Rate SDRAM, DDR SDRAM), an enhanced synchronous dynamic random access memory (ESDRAM), a synchlink dynamic random access memory (SLDRAM), and a direct rambus dynamic random access memory (DR RAM). It should be noted that the memory of the systems and methods described in this specification includes but is not limited to these and any memory of another proper type.

The network device 900 according to this embodiment of the present disclosure may be corresponding to the network device in the method 300 of the embodiment of the present disclosure, or may be corresponding to the apparatus 500 in the embodiment of the present disclosure. In addition, units or modules in the network device 900, and the foregoing other operations and/or functions are intended to implement corresponding procedures performed by the network device in the method 300. For brevity, details are not described herein again.

Figure 18:
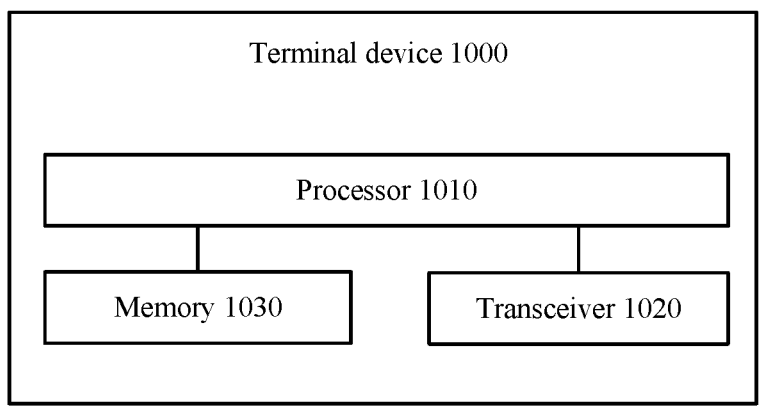
FIG. 18 is a schematic structural diagram of a terminal device according to an embodiment of the present disclosure.

FIG. 18 shows a terminal device 1000 for data transmission according to an embodiment of the present disclosure. The terminal device 1000 includes:

a processor 1010, a transceiver 1020, and a memory 1030. The processor 1010, the transceiver 1020, and the memory 1030 communicate with each other by using an internal connection path.

The memory 1030 is configured to store a program. Specifically, the program may include program code, and the program code includes a computer operation instruction. The memory 1030 may include a read-only memory and a random access memory, and provide an instruction and data to the processor 1010. The memory 1030 may include a high-speed RAM memory, or may include a non-volatile memory, for example, at least one disk memory.

The processor 1010 executes the program stored in the memory 1030, to control the transceiver 1020 to receive a signal or send a signal. The memory 1030 may be integrated into the processor 1010, or may be independent of the processor 1010.

Specifically, the transceiver 1020 is configured to receive first indication information sent by a network device, where the first indication information includes N bits, N is an integer greater than or equal to 1, the N bits are corresponding to M time units, the M time units are corresponding to at least one time length, a value of each bit is used to indicate whether a corresponding time unit is used to transmit data of the apparatus, and M is an integer greater than or equal to 1.

The processor 1010 is configured to determine, based on the first indication information received by the transceiver 1020, a time unit used to transmit the data of the apparatus.

The transceiver 1020 is further configured to receive downlink data in the time unit that is determined by the processor 1010 and that is used to transmit the data of the apparatus.

Optionally, the N bits include P1 consecutive bits and Q1 consecutive bits, N=P1+Q1, and M is greater than or equal to N.

M=M1+M2, the P1 consecutive bits are corresponding to M1 time units, the Q1 consecutive bits are corresponding to M2 time units, each of the M1 time units is corresponding to a first time length, each of the M2 time units is corresponding to a second time length, and the first time length is different from the second time length.

Optionally, a last time unit in the M1 time units is located before a first time unit in the M2 time units in time domain, and the first time length is shorter than the second time length.

Optionally, the M1 time units belong to one slot.

Optionally, the first time length is a time length corresponding to one symbol, and the second time length is a time length corresponding to one slot.

Optionally, the N bits are divided into L groups, each of the L groups includes M consecutive bits, L is a quantity of frequency domain units, the $i^{th}$ bit in an $i^{th}$ group is corresponding to a $j^{th}$ time unit in an $i^{th}$ frequency domain unit, the $i^{th}$ group belongs to the L groups, the $i^{th}$ frequency domain unit belongs to L frequency domain units, $i \in [1, L]$, $j \in [1, M]$, each of the M time units is corresponding to a third time length, M is less than or equal to N, and L is an integer greater than or equal to 1.

Optionally, if a value of the $j^{th}$ bit in the $i^{th}$ group is 0, the $j^{th}$ time unit in the $i^{th}$ frequency domain unit is used to send downlink data for the terminal device; or if a value of the $j^{th}$ bit in the $i^{th}$ group is 1, the $j^{th}$ time unit in the $i^{th}$ frequency domain unit is not used to send downlink data for the terminal device. Optionally, the N bits are divided into M groups, each of the M groups includes L consecutive bits, L is a quantity of frequency domain units, the $i^{th}$ bit in an $i^{th}$ group is corresponding to a $i^{th}$ frequency domain unit in an $i^{th}$ time unit, the $i^{th}$ group belongs to the M groups, the $i^{th}$ time unit belongs to the M time units, $i \in [1, M]$, $j \in [1, L]$, each of the M time units is corresponding to a fourth time length, M is less than or equal to N, and L is an integer greater than or equal to 1.

Optionally, if a value of the $j^{th}$ bit in the $i^{th}$ group is 0, the $j^{th}$ frequency domain unit in the $i^{th}$ time unit is used to send downlink data for the terminal device; or if a value of the $j^{th}$ bit in the $i^{th}$ group is 1, the $j^{th}$ frequency domain unit in the $i^{th}$ time unit is not used to send downlink data for the terminal device.

Optionally, the transceiver 1020 is further configured to: receive sixth indication information, where the sixth indication information is used to indicate at least one of the following values: N, M, or L.

Optionally, the transceiver 1020 is further configured to: receive second indication information sent by the network device, where the second indication information is used to indicate at least one of the following values: N, P1, or Q1.

This embodiment of the present disclosure may be applied to a processor, or implemented by a processor. The processor may be an integrated circuit chip and has a signal processing capability. In an implementation process, steps in the foregoing methods can be implemented by using a hardware integrated logical circuit in the processor 1010, or by using instructions in a form of software. The processor 1010 may be a general-purpose processor, including a central processing unit (CPU), a network processor (NP), and the like; or may be a digital signal processor (DSP), an application-specific integrated circuit (ASIC), a field programmable gate array (FPGA) or another programmable logic device, a discrete gate or transistor logic device, or a discrete hardware component. It may implement or perform the methods, steps, and logical block diagrams that are disclosed in the embodiments of the present disclosure. The general-purpose processor may be a microprocessor, or the processor may be any conventional processor or the like. Steps of the methods disclosed with reference to the embodiments of the present disclosure may be directly performed and accomplished through a hardware decoding processor, or may be performed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory 1030, and the processor 1010 reads information in the memory 1030 and completes the steps in the foregoing methods in combination with hardware of the processor 1010. To avoid repetition, details are not described herein again.

It may be understood that the memory in this embodiment of the present disclosure may be a volatile memory or a non-volatile memory, or may include a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus dynamic random access memory (DR RAM). It should be noted that the memory of the systems and methods described in this specification includes but is not limited to these and any memory of another proper type.

The terminal device 1000 according to this embodiment of the present disclosure may be corresponding to the terminal device in the method 200 of the embodiment of the present disclosure, or may be corresponding to the apparatus 600 in the embodiment of the present disclosure. In addition, units or modules in the terminal device 1000, and the foregoing other operations and/or functions are intended to implement corresponding procedures performed by the terminal device in the method 200. For brevity, details are not described herein again.

Figure 19:
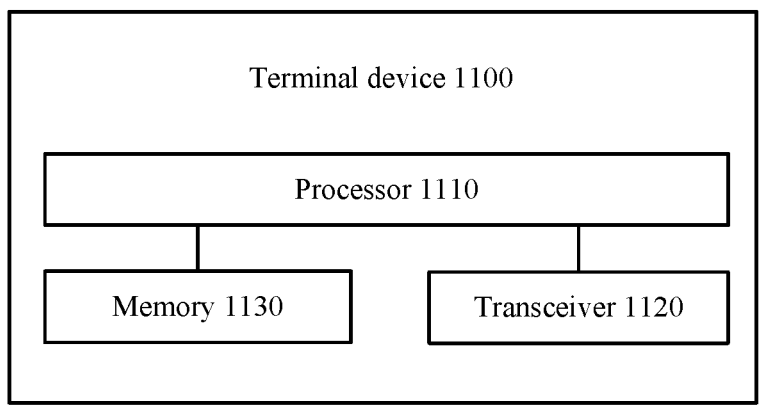
FIG. 19 is a schematic structural diagram of a terminal device according to an embodiment of the present disclosure.

FIG. 19 shows a terminal device 1100 for data transmission according to an embodiment of the present disclosure. The terminal device 1100 includes:

a processor 1110, a transceiver 1120, and a memory 1130. The processor 1110, the transceiver 1120, and the memory 1130 communicate with each other by using an internal connection path.

The memory 1130 is configured to store a program. Specifically, the program may include program code, and the program code includes a computer operation instruction. The memory 1130 may include a read-only memory and a random access memory, and provide an instruction and data to the processor 1110. The memory 1130 may include a high-speed RAM memory, or may include a non-volatile memory, for example, at least one disk memory.

The processor 1110 executes the program stored in the memory 1130, to control the transceiver 1120 to receive a signal or send a signal. The memory 1130 may be integrated into the processor 1110, or may be independent of the processor 1110.

Specifically, the transceiver 1120 is configured to receive first indication information sent by a network device, where the first indication information includes N bits, N≥1, the N bits include P2 consecutive bits and Q2 consecutive bits, and N=P2+Q2.

The P2 bits are corresponding to M3 time units, each of the M3 time units is corresponding to a fifth time length, a value of each of the P2 bits is used to indicate whether a corresponding time unit is used to transmit data of the apparatus, a first bit sequence including the Q2 bits is used to indicate a first value S1, the first value is a quantity of time units used for transmitting the data of the apparatus and that are consecutive in time domain, each of S1 time units is corresponding to a sixth time length, M3 is greater than or equal to P2, and S1 is an integer greater than or equal to 1.

Alternatively, a second bit sequence including the P2 bits is used to indicate a second value S2, the second value is a quantity of time units used for transmitting data of the terminal device, a third bit sequence including the Q2 bits is used to indicate a third value S3, the third value is a quantity of time units used for transmitting the data of the apparatus, each of S2 time units is corresponding to a seventh time length, each of S3 time units is corresponding to an eighth time length, the seventh time length is different from the eighth time length, S2 is an integer greater than or equal to 1, and S3 is an integer greater than or equal to 1.

The processor 1110 is configured to determine, based on the first indication information received by the transceiver 1120, a time unit used to transmit the data of the apparatus.

The transceiver 1120 is further configured to receive downlink data based on the time unit that is determined by the processor 1110 and that is used to transmit the data of the terminal device.

Optionally, the fifth time length is shorter than the sixth time length.

Optionally, the transceiver 1120 is further configured to:
receive third indication information sent by the network device, where the third indication information is used to indicate at least one of the following values: N, P2, or Q2.

This embodiment of the present disclosure may be applied to a processor, or implemented by a processor. The processor may be an integrated circuit chip and has a signal processing capability. In an implementation process, steps in the foregoing methods can be implemented by using a hardware integrated logical circuit in the processor 1110, or by using instructions in a form of software. The processor 1110 may be a general-purpose processor, including a central processing unit (CPU), a network processor (NP), and the like; or may be a digital signal processor (DSP), an application-specific integrated circuit (ASIC), a field programmable gate array (FPGA) or another programmable logic device, a discrete gate or transistor logic device, or a discrete hardware component. It may implement or perform the methods, steps, and logical block diagrams that are disclosed in the embodiments of the present disclosure. The general-purpose processor may be a microprocessor, or the processor may be any conventional processor or the like. Steps of the methods disclosed with reference to the embodiments of the present disclosure may be directly performed and accomplished through a hardware decoding processor, or may be performed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory 1130, and the processor 1110 reads information in the memory 1130 and completes the steps in the foregoing methods in combination with hardware of the processor 1110. To avoid repetition, details are not described herein again.

It may be understood that the memory in this embodiment of the present disclosure may be a volatile memory or a non-volatile memory, or may include a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus dynamic random access memory (DR RAM). It should be noted that the memory of the systems and methods described in this specification includes but is not limited to these and any memory of another proper type.

The terminal device 1100 according to this embodiment of the present disclosure may be corresponding to the terminal device in the method 300 of the embodiment of the present disclosure, or may be corresponding to the apparatus 700 in the embodiment of the present disclosure. In addition, units or modules in the terminal device 1100, and the foregoing other operations and/or functions are intended to implement corresponding procedures performed by the terminal device in the method 300. For brevity, details are not described herein again.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present disclosure, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of the present disclosure may be integrated into one processing unit, or each of the units may exist alone physically, or two or more units are integrated into one unit.

When functions are implemented in the form of a software function unit and sold or used as an independent product, the functions may be stored in a computer-readable storage medium. Based on such an understanding, the technical solutions of the embodiments of the present disclosure essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data receiving method, wherein the method comprises:

receiving, by a terminal device, first indication information from a network device, wherein the first indication information comprises N bits, N is a positive integer, the N bits are corresponding to M time units, wherein the N bits comprises M groups, each of the M groups comprises L consecutive bits, L is a quantity of frequency domain units, a jth bit in an ith group is corresponding to a jth frequency domain unit in an ith time unit, the ith group belongs to the M groups, the ith time unit belongs to the M time units, $i \in [1, M]$, $j \in [1, L]$, M is less than or equal to N, and L is a positive integer, the $j^{th}$ bit in the $i^{th}$ group indicates whether a corresponding time frequency unit is used to transmit data of the terminal device, and M is a positive integer, the corresponding time frequency unit of the jth bit in the ith group is the jth frequency domain unit in the ith group; and receiving, by the terminal device, downlink data in a time frequency unit from the network device, wherein the time frequency unit is indicated by the N bits.

2. The method according to claim 1, wherein:

in response to a value of the $j^{th}$ bit in the $i^{th}$ group being 0, the $j^{th}$ frequency domain unit in the $i^{th}$ time unit is used to send downlink data for the terminal device; or in response to a value of the $j^{th}$ bit in the $i^{th}$ group being 1, the $j^{th}$ frequency domain unit in the $i^{th}$ time unit is not used to send downlink data for the terminal device.

3. The method according to claim 1, wherein the method further comprises:

receiving, by the terminal device, further indication information from the network device, wherein the further indication information indicates at least one of the following values: N, M, or L.

4. The method according to claim 1, wherein:
each of the M time units is corresponding to a same time length; or
part of the M time units are corresponding to a same time length.

5. A data transmission apparatus, comprising one or more processors and a non-transitory computer-readable storage medium including computer-executable instructions executable by the one or more processors to perform operations comprising:
generating first indication information;
sending the first indication information to a terminal device, wherein the first indication information comprises N bits, the N bits are corresponding to M time units, wherein the N bits comprises M groups, each of the M groups comprises L consecutive bits, L is a quantity of frequency domain units, a $j^{th}$ bit in an $i^{th}$ group is corresponding to a $j^{th}$ frequency domain unit in a $i^{th}$ time unit, the $i^{th}$ group belongs to the M groups, the $i^{th}$ time unit belongs to the M time units, $i \in [1, M]$, $j \in [1, L]$, M is less than or equal to N, and L is a positive integer, the $j^{th}$ bit in the $i^{th}$ group indicates whether a corresponding time frequency unit is used to transmit data of the terminal device, M is a positive integer, and N is a positive integer, the corresponding time frequency unit of the jth bit in the ith group is the jth frequency domain unit in the ith group; and
sending downlink data in a time frequency unit to the terminal device, wherein the time frequency unit is indicated by the N bits.

6. The apparatus according to claim 5, wherein:
in response to a value of the $j^{th}$ bit in the $i^{th}$ group being 0, the $j^{th}$ frequency domain unit in the $i^{th}$ time unit is used to send downlink data for the terminal device; or
in response to a value of the $j^{th}$ bit in the $i^{th}$ group being 1, the $j^{th}$ frequency domain unit in the $i^{th}$ time unit is not used to send downlink data for the terminal device.

7. The apparatus according to claim 5, wherein the operations further comprise:
sending further indication information, wherein the further indication information indicates at least one of the following values: N, M, or L.

8. The apparatus according to claim 5, wherein:
each of the M time units is corresponding to a same time length; or
part of the M time units are corresponding to a same time length.

9. A data transmission apparatus, comprising one or more processors and a non-transitory computer-readable storage medium including computer-executable instructions executable by the one or more processors to perform operations comprising:
receiving first indication information from a network device, wherein the first indication information comprises N bits, N is a positive integer, the N bits are corresponding to M time units, wherein the N bits comprises M groups, each of the M groups comprises L consecutive bits, L is a quantity of frequency domain units, a jth bit in an ith group is corresponding to a jth frequency domain unit in an ith time unit, the ith group belongs to the M groups, the ith time unit belongs to the M time units, $i \in [1, M]$, $j \in [1, L]$, M is less than or equal to N, and L is a positive integer, the $j^{th}$ bit in the $i^{th}$ group indicates whether a corresponding time frequency unit is used to transmit data of the terminal device, and M is a positive integer, the corresponding time frequency unit of the jth bit in the ith group is the jth frequency domain unit in the ith group; and
receiving downlink data in a time frequency unit from the network device, wherein the time frequency unit is indicated by the N bits.

10. The apparatus according to claim 9, wherein:
in response to a value of the $j^{th}$ bit in the $i^{th}$ group being 0, the $j^{th}$ frequency domain unit in the $i^{th}$ time unit is used to send downlink data for the apparatus; or
in response to a value of the $j^{th}$ bit in the $i^{th}$ group being 1, the $j^{th}$ frequency domain unit in the $i^{th}$ time unit is not used to send downlink data for the apparatus.

11. The apparatus according to claim 9, wherein the operations further comprise:
receiving further indication information from the network device, wherein the sixth indication information indicates at least one of the following values: N, M, or L.

12. The apparatus according to claim 9, wherein:
each of the M time units is corresponding to a same time length; or
part of the M time units are corresponding to a same time length.

* * * * *